US012777451B2

(12) United States Patent
Manolakos et al.

(10) Patent No.: US 12,777,451 B2
(45) Date of Patent: Oct. 27, 2026

(54) POSITIONING STATE INFORMATION SECURITIZATION IN WIRELESS COMMUNICATIONS

(71) Applicant: QUALCOMM Incorporated, San Diego, CA (US)

(72) Inventors: Alexandros Manolakos, Athens (GR); Ahmed Elshafie, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 280 days.

(21) Appl. No.: 18/693,837

(22) PCT Filed: Nov. 9, 2022

(86) PCT No.: PCT/US2022/049462

§ 371 (c)(1),
(2) Date: Mar. 20, 2024

(87) PCT Pub. No.: WO2023/101799

PCT Pub. Date: Jun. 8, 2023

(65) Prior Publication Data

US 2024/0406910 A1 Dec. 5, 2024

(30) Foreign Application Priority Data

Dec. 1, 2021 (GR) .............................. 20210100835

(51) Int. Cl.
*H04W 64/00* (2009.01)
*H04B 17/309* (2015.01)
(Continued)

(52) U.S. Cl.
CPC .......... *H04W 64/00* (2013.01); *H04B 17/328* (2023.05); *H04B 17/346* (2023.05); *H04W 12/043* (2021.01); *H04W 92/18* (2013.01)

(58) Field of Classification Search
CPC . H04L 63/0428; H04L 63/20; H04L 2209/80; H04L 63/1408; H04L 9/3247;
(Continued)

(56) References Cited

U.S. PATENT DOCUMENTS

2006/0282668 A1 * 12/2006 Leitch ........................ H04L 9/00 713/171
2020/0021979 A1 * 1/2020 Segev ................... H04W 12/03
(Continued)

FOREIGN PATENT DOCUMENTS

EP 1993319 A2 11/2008
WO 2021167690 A1 8/2021

OTHER PUBLICATIONS

International Search Report and Written Opinion—PCT/US2022/049462—ISA/EPO—Feb. 23, 2023.

*Primary Examiner* — Kwasi Karikari
(74) *Attorney, Agent, or Firm* — QUALCOMM Incorporated

(57) ABSTRACT

Full encryption and reporting of positioning state information (PSI) of a user equipment (UE) in wireless communications may be unable to be performed to a desired level using current security keys at the UE. As such, a UE may selectively perform partial securitization of PSI. A UE obtains one or more PSI to be reported in one or more PSI reports, identifies a security priority associated with each PSI, and generates the one or more PSI reports from the one or more PSI based on a reporting configuration. Generating the one or more PSI reports includes, for each PSI of the one or more PSI, identifying whether the UE is to encrypt the PSI using one or more security keys at the UE based on the reporting configuration. The UE also reports the one or more PSI reports to a second device, such as a base station or another UE.

30 Claims, 5 Drawing Sheets

(51) Int. Cl.
*H04B 17/318* (2015.01)
*H04W 12/043* (2021.01)
*H04W 92/18* (2009.01)

(58) Field of Classification Search
CPC ..... H04L 9/0861; H04L 9/30; H04L 63/1441; H04L 9/14; H04L 9/0822; H04L 63/123; H04L 9/0825; H04L 63/0823; H04L 9/0819; H04L 9/0643; H04L 9/16; H04L 63/0442; H04L 2209/60; H04L 9/088; H04L 9/3236; H04L 2209/84; H04L 9/08; H04L 63/126; H04L 9/40; H04L 2463/061; H04L 65/80; H04L 9/0816; H04L 47/24; H04L 1/1887; H04L 41/5003; H04L 41/5022; H04W 12/02; H04W 12/03; H04W 4/029; H04W 12/63; H04W 4/80; H04W 12/33; H04W 12/08; H04W 4/70; H04W 12/10; H04W 28/065; H04W 12/0431; H04W 12/108; H04W 12/106; H04W 12/00; H04W 12/0433; H04W 12/0471; H04W 28/24; H04W 4/38; H04W 52/265; H04W 4/44; H04W 52/0225; H04W 4/027; H04W 4/34
See application file for complete search history.

(56) References Cited

U.S. PATENT DOCUMENTS

2021/0120405 A1* 4/2021 Kim .................... H04L 27/2656
2021/0235271 A1* 7/2021 Bergquist ............ H04W 12/088
2021/0337508 A1* 10/2021 Gunnarsson .......... H04W 48/12

* cited by examiner

POSITIONING STATE INFORMATION SECURITIZATION IN WIRELESS COMMUNICATIONS

CROSS-REFERENCE TO RELATED APPLICATIONS

This application is a National Stage Application filed under 35 U.S.C. § 371 of PCT International Application No. PCT/US2022/049462, entitled "POSITIONING STATE INFORMATION SECURITIZATION IN WIRELESS COMMUNICATIONS" and filed Nov. 9, 2022, which claims the benefit of Greek patent application No. 20210100835, entitled "POSITIONING STATE INFORMATION SECURITIZATION IN WIRELESS COMMUNICATIONS" and filed on Dec. 1, 2021, which are expressly incorporated by reference herein in their entirety.

TECHNICAL FIELD

Subject matter disclosed herein relates to the securitization of positioning state information of user equipment in wireless communications and more particularly to selective inclusion and encryption of positioning state information reported by the user equipment to another device.

Information

The positioning state information of a user equipment (UE), such as a cellular telephone, may be useful or essential to a number of applications including wireless locationing, navigation, direction finding, cell selection, and asset tracking. The positioning state information of a UE may be determined based on information gathered from wireless communications or other various systems. For example, in wireless locationing, reference signals in radio frequency (RF) communications may be used to determine positioning state information of a UE. In a wireless network (e.g., a cellular network implemented according to 4G (also referred to as Fourth Generation) Long Term Evolution (LTE) radio access or 5G (also referred to as Fifth Generation) "New Radio" (NR)), a base station (or another UE) may transmit RF signals received by the UE and used by the UE for determining its positioning state information. The positioning state information may be reported by the UE to another device of the wireless network. The positioning state information may be sensitive information that is to be protected when reported. Improvements in the securitization of positioning state information for reporting is desirable.

SUMMARY

At various instances, a UE obtains different types of positioning state information (PSI), with the PSI to be provided to another device of a wireless network (such as a base station (BS) or another UE in a cellular network). If able, the UE is to secure the PSI for transmission by encrypting the PSI using one or more security keys, with the encrypted PSI included in one or more PSI reports that are to be transmitted to the other device. If the UE is unable to encrypt all of the PSI using the existing security keys (such as the security keys having expired, the security keys not offering a sufficient level of encryption for some types of PSI, or the security keys only being available to encrypt a portion of the PSI), the UE identifies which PSI is to be encrypted using the security keys, which PSI may be dropped from being reported, and which PSI may be transmitted unencrypted. The UE generates one or more PSI reports based which PSI is encrypted, which is dropped, and which PSI is kept unencrypted, and the UE reports the one or more PSI reports to another device (such as transmitting the one or more PSI reports to a base station or to another UE). Which PSI is to be encrypted, dropped, or kept unencrypted is based on a security priority of the different types of PSI with reference to one another.

In one implementation, a method for supporting securitization of PSI by a UE in a cellular network includes: obtaining one or more PSI to be reported in one or more PSI reports; identifying a security priority associated with each PSI; generating the one or more PSI reports from the one or more PSI based on a reporting configuration; and reporting the one or more PSI reports to a second device. Generating the one or more PSI reports includes, for each PSI of the one or more PSI, identifying whether the UE is to encrypt the PSI using one or more security keys at the UE based on the reporting configuration.

In one implementation, a device configured for supporting securitization of PSI in a cellular network includes at least one transceiver, at least one memory, and at least one processor coupled to the at least one transceiver and the at least one memory. The at least one processor is configured to cause the device to: obtain one or more PSI to be reported in one or more PSI reports; identify a security priority associated with each PSI; generate the one or more PSI reports from the one or more PSI based on a reporting configuration; and report the one or more PSI reports to a second device. Generating the one or more PSI reports includes, for each PSI of the one or more PSI, identifying whether the UE is to encrypt the PSI using one or more security keys at the UE based on the reporting configuration.

In one implementation, a non-transitory computer-readable medium stores instructions that, when executed by at least one processor of a device configured for supporting securitization of PSI in a cellular network, causes the device to: obtain one or more PSI to be reported in one or more PSI reports; identify a security priority associated with each PSI; generate the one or more PSI reports from the one or more PSI based on a reporting configuration; and report the one or more PSI reports to a second device. Generating the one or more PSI reports includes, for each PSI of the one or more PSI, identifying whether the UE is to encrypt the PSI using one or more security keys at the UE based on the reporting configuration.

In one implementation, a device for supporting securitization of PSI in a cellular network includes: means for obtaining one or more PSI to be reported in one or more PSI reports; means for identifying a security priority associated with each PSI; means for generating the one or more PSI reports from the one or more PSI based on a reporting configuration; and means for reporting the one or more PSI reports to a second device. Generating the one or more PSI reports includes, for each PSI of the one or more PSI, identifying whether the UE is to encrypt the PSI using one or more security keys at the UE based on the reporting configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

DETAILED DESCRIPTION

Figure 1:
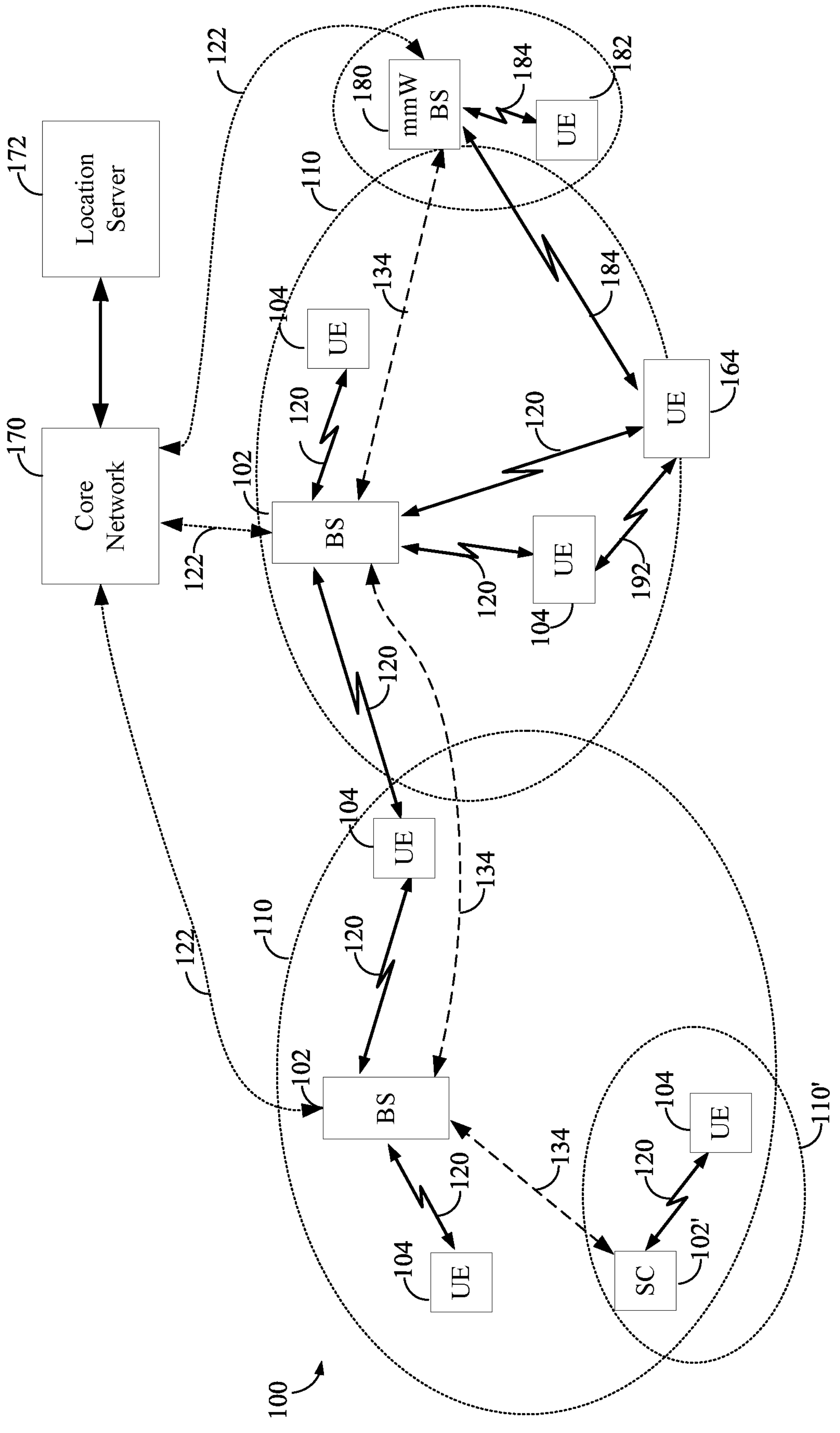
FIG. 1 illustrates an example wireless communications system.

Aspects of the disclosure are provided in the following description and related drawings directed to various examples provided for illustration purposes. Alternate aspects may be devised without departing from the scope of the disclosure. Additionally, well-known elements of the disclosure will not be described in detail or will be omitted so as not to obscure the relevant details of the disclosure.

The words "exemplary" and/or "example" are used herein to mean "serving as an example, instance, or illustration." Any aspect described herein as "exemplary" and/or "example" is not necessarily to be construed as preferred or advantageous over other aspects. Likewise, the term "aspects of the disclosure" does not require that all aspects of the disclosure include the discussed feature, advantage or mode of operation.

Those of skill in the art will appreciate that the information and signals described below may be represented using any of a variety of different technologies and techniques. For example, data, instructions, commands, information, signals, bits, symbols, and chips that may be referenced throughout the description below may be represented by voltages, currents, electromagnetic waves, magnetic fields or particles, optical fields or particles, or any combination thereof, depending in part on the particular application, in part on the desired design, in part on the corresponding technology, etc.

Further, many aspects are described in terms of sequences of actions to be performed by, for example, elements of a computing device. It will be recognized that various actions described herein can be performed by specific circuits (e.g., application specific integrated circuits (ASICs)), by program instructions being executed by one or more processors, or by a combination of both. Additionally, the sequence(s) of actions described herein can be considered to be embodied entirely within any form of non-transitory computer-readable storage medium having stored therein a corresponding set of computer instructions that, upon execution, would cause or instruct an associated processor of a device to perform the functionality described herein. Thus, the various aspects of the disclosure may be embodied in a number of different forms, all of which have been contemplated to be within the scope of the claimed subject matter. In addition, for each of the aspects described herein, the corresponding form of any such aspects may be described herein as, for example, "logic configured to" perform the described action.

As used herein, the terms "user equipment" (UE) and "base station" are not intended to be specific or otherwise limited to any particular Radio Access Technology (RAT), unless otherwise noted. In general, a UE may be any wireless communication device (e.g., a mobile phone, router, tablet computer, laptop computer, tracking device, wearable (e.g., smartwatch, glasses, augmented reality (AR)/virtual reality (VR) headset, etc.), vehicle (e.g., automobile, motorcycle, bicycle, etc.), Internet of Things (IoT) device, etc.) used by a user to communicate over a wireless communications network. A UE may be mobile or may (e.g., at certain times) be stationary, and may communicate with a Radio Access Network (RAN), which may also be referred to as a cellular network. As used herein, the term "UE" may be referred to interchangeably as an "access terminal" or "AT," a "client device," a "wireless device," a "subscriber device," a "subscriber terminal," a "subscriber station," a "user terminal" or UT, a "mobile terminal," a "mobile station," "mobile device," or variations thereof. Generally, UEs can communicate with a core network via a RAN, and through the core network the UEs can be connected with external networks such as the Internet and with other UEs. Of course, other mechanisms of connecting to the core network and/or the Internet are also possible for the UEs, such as over wired access networks, wireless local area network (WLAN) networks (e.g., based on IEEE 802.11, etc.) and so on.

A base station may operate according to one of several RATs in communication with UEs depending on the network in which it is deployed, and may be alternatively referred to as an access point (AP), a network node, a NodeB, an evolved NodeB (eNB), a New Radio (NR) Node B (also referred to as a gNodeB or gNB), etc. In addition, in some systems a base station may provide purely edge node signaling functions while in other systems it may provide additional control and/or network management functions. A communication link through which UEs can send signals to a base station is called an uplink (UL) or UL channel (e.g., a reverse traffic channel, a reverse control channel, an access channel, etc.). A communication link through which the base station can send signals to UEs is called a downlink (DL), DL channel, or forward link channel (e.g., a paging channel, a control channel, a broadcast channel, a forward traffic channel, etc.). A communication link through which a UE signals to another UE is called a sidelink (SL) or sidelink channel. As used herein, the term traffic channel (TCH) can refer to either an UL/reverse, DL/forward, or SL traffic channel.

The term "base station" may refer to a single physical transmission-reception point (TRP), which may also be referred to as a transmit/receive point, or to multiple physical TRPs that may or may not be co-located. For example, where the term "base station" refers to a single physical TRP, the physical TRP may be an antenna of the base station corresponding to a cell of the base station. Where the term "base station" refers to multiple co-located physical TRPs, the physical TRPs may be an array of antennas (e.g., as in a multiple-input multiple-output (MIMO) system or where the base station employs beamforming) of the base station. Where the term "base station" refers to multiple non-co-located physical TRPs, the physical TRPs may be a distributed antenna system (DAS) (a network of spatially separated antennas connected to a common source via a transport medium) or a remote radio head (RRH) (a remote base station connected to a serving base station). Alternatively, the non-co-located physical TRPs may be the serving base station receiving the measurement report from the UE and a neighbor base station whose reference radio frequency (RF) signals the UE is measuring.

Various positioning state information (PSI) may be used for different services, such as device locationing, cell selection, and so on. PSI may be any information that is to be provided by the UE to another device in a wireless network (such as a cellular network) that can be used to determine a location of the UE or other positioning information regarding the UE. PSI may be defined in the Third Generation Partnership Project (3GPP) set of standards for LTE (4G) and New Radio (NR) for Fifth Generation (5G), the Institute of Electrical and Electronics Engineers (IEEE) set of standards for wireless local area networks (WLAN), or other standards bodies for wireless communications. With reference to a cellular network, example types of PSI may include one or more of: a reference signal timing difference (RSTD) vector; an RSTD time-stamp; a UE receive-transmit (Rx-Tx) vector; an Rx-Tx time-stamp; a reference signal received power (RSRP) vector; an RSRP time-stamp; a quality metric vector; a quality metric time-stamp; a velocity vector; a velocity time-stamp; a time of arrival (TOA) vector; a TOA time-stamp; a multipath vector; a multipath time-stamp; a line of sight (LOS)/non-line of sight (NLOS) (LOS/NLOS) vector; an LOS/NLOS time-stamp; a signal to interference plus noise ratio (SINR) vector; and an SINR time-stamp. As used herein, a vector includes one or more PSI measurements (which may also be referred to as positioning measurements) to be provided to another device of the wireless network. For example, an RSRP vector may include one or more RSRP measurements for one or more defined reference signals received at the UE (such as on a DL channel from a base station).

A UE may be configured to obtain one or more PSI. For example, a base station may indicate one or more portions of a DL as a reference signal, and the reference signal may be used by the UE to measure one or more instances of an RSTD, an RSRP, an SINR, or other types of PSI. The UE may be configured to report the PSI to a base station (via an UL) or another UE (via an SL), and the PSI may be forwarded to a location server or another network component for use in performing one or more network operations. For example, a location server for a cellular network may use the PSI to calculate a location of the UE within the cellular network (such as with reference to one or more base stations of a fixed and known position). UE locationing may be used to assist with future cell selection to continue serving the UE, with navigation, or with performing other services of the cellular network. A base station may also use UE locationing for beamforming or other operations.

PSI may be sensitive information for a UE. For example, if PSI is transmitted unencrypted by the UE to another device, a third device sniffing over the air (OTA) transmissions may receive the PSI and use the PSI to identify the UE, calculate a location of the UE, or determine other sensitive characteristics regarding the UE. As such, a UE may be configured to secure the PSI being transmitted. To secure the PSI, the UE may encrypt the PSI using one or more security keys, with the encrypted PSI being included in one or more PSI reports transmitted to another device. As used herein, a security key (SK) may also be referred to as a secret key, encryption key, or key.

In some instances, the UE may not have a sufficient security key to encrypt the PSI. For example, a security key may expire after a certain amount of time or after a certain number of uses. A base station or another device may periodically provide a new security key to the UE to ensure that the UE has a valid security key for use during encryption. If a security key expires and the UE does not receive a new security key, encryption using the expired security key may be considered invalid. If a security key is to be used only a certain number of times for encryption, the remaining number of times that the security key can be used might not be sufficient to encrypt the PSI in all of multiple PSI reports to be transmitted or to encrypt all of multiple PSI to be included in a PSI report. In another example, encryption using a security key may be defined for a fixed amount of data (such as a fixed number of bits). The amount of PSI to be encrypted may be greater than the fixed amount of data that can be encrypted using a security key. In another example, multiple security keys may be used in encrypting PSI. For example, PSI may be defined in a cellular network to require 256-bit encryption before transmission. If each security key is 128 bits, the UE may use two security keys to provide 256-bit encryption. If one key expires, is not received by the UE, or is otherwise unavailable, the UE may only be able to provide 128-bit encryption using the other valid security key while 256-bit encryption is required. In another example, a channel between a UE and another device may be defined such that only a limited amount of the channel (such as a defined number of slots or bits of an UL or SL) is to include encrypted data. The allowed size of encrypted data that can be transmitted may be smaller than the total size of all encrypted PSI to be transmitted.

Typically, if a UE is unable to secure all of the PSI satisfactorily, none of the PSI is reported. For example, if multiple measurements of PSI are to be reported and if all measurements of the PSI cannot be secured, none of the PSI is transmitted to another device. As such, enhancements to securing PSI for wireless communications are desirable.

Accordingly, as described herein, enhancements to securing PSI for wireless communications are described. In one implementation, a UE obtains one or more PSI to be reported in one or more PSI reports. For example, the UE may measure one or more PSI or may receive one or more PSI measured by another device (such as by a peer UE). The UE also identifies a security priority associated with each PSI. For example, the UE may identify a priority based on the type of PSI, and the priority may be with reference to the other types of PSI (such as an RSTD vector being more important to encrypt than an SINR vector). The UE further generates the one or more PSI reports from the one or more PSI based on a reporting configuration. Generating the one or more PSI reports includes, for each PSI of the one or more PSI, identifying whether the UE is to encrypt the PSI using one or more security keys at the UE based on the reporting configuration. The UE also reports the one or more PSI reports to a second device (such as a base station or another UE). The reporting configuration indicates how the PSI is to be reported, such as the format of the PSI reports (including an indication of what fields are to be in the PSI report) and when and to whom the PSI reports are to be transmitted. The reporting configuration may also indicate a security priority for different types of PSI. The UE may determine whether to encrypt a PSI, drop the PSI from being reported, or transmit the PSI unencrypted based on the reporting configuration. The UE may also prioritize and order the PSI for transmission based on the security priority from highest priority PSI to lowest priority PSI. If the UE is only able to encrypt a portion of the PSI (such as only a subset of PSI reports or a subset of PSI within a PSI report), the UE may encrypt the beginning portion of the reordered PSI that has a higher priority than the latter portion of the reordered PSI. In this manner, the UE may provide partial securitization of the PSI being reported based on the security priorities associated with the PSI.

FIG. 1 illustrates an example wireless communications system 100. The wireless communications system 100 (which may also be referred to as a wireless wide area network (WWAN) or a wireless network (e.g., a cellular network)) may include various base stations 102, sometimes referred to herein as gNBs 102 or other types of NBs, and various UEs 104. The base stations 102 may include macro cell base stations (high power wireless base stations) and/or small cell base stations (low power wireless base stations). In an aspect, the macro cell base station may include eNBs where the wireless communications system 100 corresponds to an LTE network, or gNBs where the wireless communications system 100 corresponds to a 5G network, or a combination of both, and the small cell base stations may include femtocells, picocells, microcells, etc.

The base stations 102 may collectively form a RAN and interface with a core network 170 (e.g., an evolved packet core (EPC) or next generation core (NGC)) through backhaul links 122, and through the core network 170 to one or more location servers 172. In addition to other functions, the base stations 102 may perform functions that relate to one or more of transferring user data, radio channel ciphering and deciphering, integrity protection, header compression, mobility control functions (e.g., handover, dual connectivity), inter-cell interference coordination, connection setup and release, load balancing, distribution for non-access stratum (NAS) messages, NAS node selection, synchronization, RAN sharing, multimedia broadcast multicast service (MBMS), subscriber and equipment trace, RAN information management (RIM), paging, positioning, and delivery of warning messages. The base stations 102 may communicate with each other directly or indirectly (e.g., through the EPC/NGC) over backhaul links 134, which may be wired or wireless.

The base stations 102 may wirelessly communicate with the UEs 104. Each of the base stations 102 may provide communication coverage for a respective geographic coverage area 110. In an aspect, one or more cells may be supported by a base station 102 in each coverage area 110. A "cell" is a logical communication entity used for communication with a base station (e.g., over some frequency resource, referred to as a carrier frequency, component carrier, carrier, band, or the like), and may be associated with an identifier (e.g., a physical cell identifier (PCID) or a virtual cell identifier (VCID)) for distinguishing cells operating via the same or a different carrier frequency. In some cases, different cells may be configured according to different protocol types (e.g., machine-type communication (MTC), narrowband IoT (NB-IoT), enhanced mobile broadband (eMBB), or others) that may provide access for different types of UEs. In some cases, the term "cell" may also refer to a geographic coverage area of a base station (e.g., a sector), insofar as a carrier frequency can be detected and used for communication within some portion of geographic coverage areas 110.

While neighboring macro cell base station 102 geographic coverage areas 110 may partially overlap (e.g., in a handover region), some of the geographic coverage areas 110 may be substantially overlapped by a larger geographic coverage area 110. For example, a small cell base station 102' may have a coverage area 110' that substantially overlaps with the coverage area 110 of one or more macro cell base stations 102. A network that includes both small cell and macro cell base stations may be known as a heterogeneous network. A heterogeneous network may also include home eNBs (HeNBs), which may provide service to a restricted group known as a closed subscriber group (CSG).

The communication links 120 between the base stations 102 and the UEs 104 may include UL (also referred to as reverse link) transmissions from a UE 104 to a base station 102 and/or downlink (DL) (also referred to as forward link) transmissions from a base station 102 to a UE 104. The communication links 120 may use MIMO antenna technology, including spatial multiplexing, beamforming, and/or transmit diversity. The communication links 120 may be through one or more carrier frequencies. Allocation of carriers may be asymmetric with respect to DL and UL (e.g., more or less carriers may be allocated for DL than for UL).

The small cell base station 102' may operate in a licensed and/or an unlicensed frequency spectrum. When operating in an unlicensed frequency spectrum, the small cell base station 102' may employ LTE or 5G technology and use the same 5 GHZ unlicensed frequency spectrum as used by a WLAN AP. The small cell base station 102', employing LTE/5G in an unlicensed frequency spectrum, may boost coverage to and/or increase capacity of the access network. LTE in an unlicensed spectrum may be referred to as LTE-unlicensed (LTE-U), licensed assisted access (LAA), or MulteFire.

The wireless communications system 100 may further include a millimeter wave (mmW) base station 180 that may operate in mmW frequencies and/or near mmW frequencies in communication with a UE 182. Extremely high frequency (EHF) is part of the RF in the electromagnetic spectrum. EHF has a range of 30 GHz to 300 GHz and a wavelength between 1 millimeter and 10 millimeters. Radio waves in this band may be referred to as a millimeter wave. Near mmW may extend down to a frequency of 3 GHZ with a wavelength of 100 millimeters. The super high frequency (SHF) band extends between 3 GHz and 30 GHz, also referred to as centimeter wave. Communications using the mmW/near mmW radio frequency band have high path loss and a relatively short range. The mmW base station 180 and the UE 182 may utilize beamforming (transmit and/or receive) over a mmW communication link 184 to compensate for the extremely high path loss and short range. Further, it will be appreciated that in alternative configurations, one or more base stations 102 may also transmit using mmW or near mmW and beamforming. Accordingly, it will be appreciated that the foregoing illustrations are merely examples and should not be construed to limit the various aspects disclosed herein.

In 5G, the frequency spectrum in which wireless nodes (e.g., base stations 102/180, UEs 104/182) operate is divided into multiple frequency ranges, FR1 (from 450 to 6000 MHZ), FR2 (from 24250 to 52600 MHZ), FR3 (above 52600 MHZ), and FR4 (between FR1 and FR2). In a multi-carrier system, such as 5G, one of the carrier frequencies is referred to as the "primary carrier" or "anchor carrier" or "primary serving cell" or "PCell," and the remaining carrier frequencies are referred to as "secondary carriers" or "secondary serving cells" or "SCells." In carrier aggregation, the anchor carrier is the carrier operating on the primary frequency (e.g., FR1) utilized by a UE 104/182 and the cell in which the UE 104/182 either performs the initial radio resource control (RRC) connection establishment procedure or initiates the RRC connection re-establishment procedure. The primary carrier carries all common and UE-specific control channels. A secondary carrier is a carrier operating on a second frequency (e.g., FR2) that may be configured once the RRC connection is established between the UE 104 and the anchor carrier and that may be used to provide additional radio resources. The secondary carrier may contain only necessary signaling information and signals, for example, those that are UE-specific may not be present in the secondary carrier, since both primary uplink and downlink carriers are typically UE-specific. This means that different UEs 104/182 in a cell may have different downlink primary carriers. The same is true for the uplink primary carriers. The network is able to change the primary carrier of any UE 104/182 at any time. This is done, for example, to balance the load on different carriers. Because a "serving cell" (whether a PCell or an SCell) corresponds to a carrier frequency/component carrier over which some base station is communicating, the term "cell," "serving cell," "component carrier," "carrier frequency," and the like can be used interchangeably. For example, still referring to FIG. 1, one of the frequencies utilized by the macro cell base stations 102 may be an anchor carrier (or "PCell") and other frequencies utilized by the macro cell base stations 102 and/or the mmW base station 180 may be secondary carriers ("SCells"). The simultaneous transmission and/or reception of multiple carriers enables the UE 104/182 to significantly increase its data transmission and/or reception rates. For example, two 20 MHz aggregated carriers in a multi-carrier system would theoretically lead to a two-fold increase in data rate (i.e., 40 MHz), compared to that attained by a single 20 MHz carrier.

The wireless communications system 100 may further include one or more UEs that connect indirectly to one or more communication networks via one or more device-to-device (D2D) peer-to-peer (P2P) links. In the example of FIG. 1, UE 164 has a D2D P2P link 192 with one of the UEs 104 connected to one of the base stations 102. Link 192 may be used to indirectly obtain wireless connectivity or for D2D communications between UEs 104 and 164 without use of the base station 102. In some implementations, the link 192 is a sidelink (SL) between the UEs 104 and 164. In an example, the D2D P2P link 192 may be supported with any well-known D2D RAT, such as LTE Direct (LTE-D), WiFi Direct (WiFi-D), Bluetooth®, and so on.

The wireless communications system 100 may include a UE 164 that may communicate with a macro cell base station 102 over a communication link 120 and/or the mmW base station 180 over a mmW communication link 184. For example, the macro cell base station 102 may support a PCell and one or more SCells for the UE 164 and the mmW base station 180 may support one or more SCells for the UE 164.

The location server 172 may include one or more location servers that are to configure the wireless network to support locationing services based on measurements provided by one or more UEs 104. The location server 172 may determine the location of each UE 104 being served by the wireless network 100 or other information regarding the UEs 104. For example, the location server 172 may indicate one or more of the security priority of PSI, the types of PSI to be reported, the encryption requirements for PSI, the format of PSI reports, the configuration of a channel for transmitting PSI reports, or the security keys to be used by the UEs 104 for securing PSI for transmission in one or more PSI reports.

Figure 2:
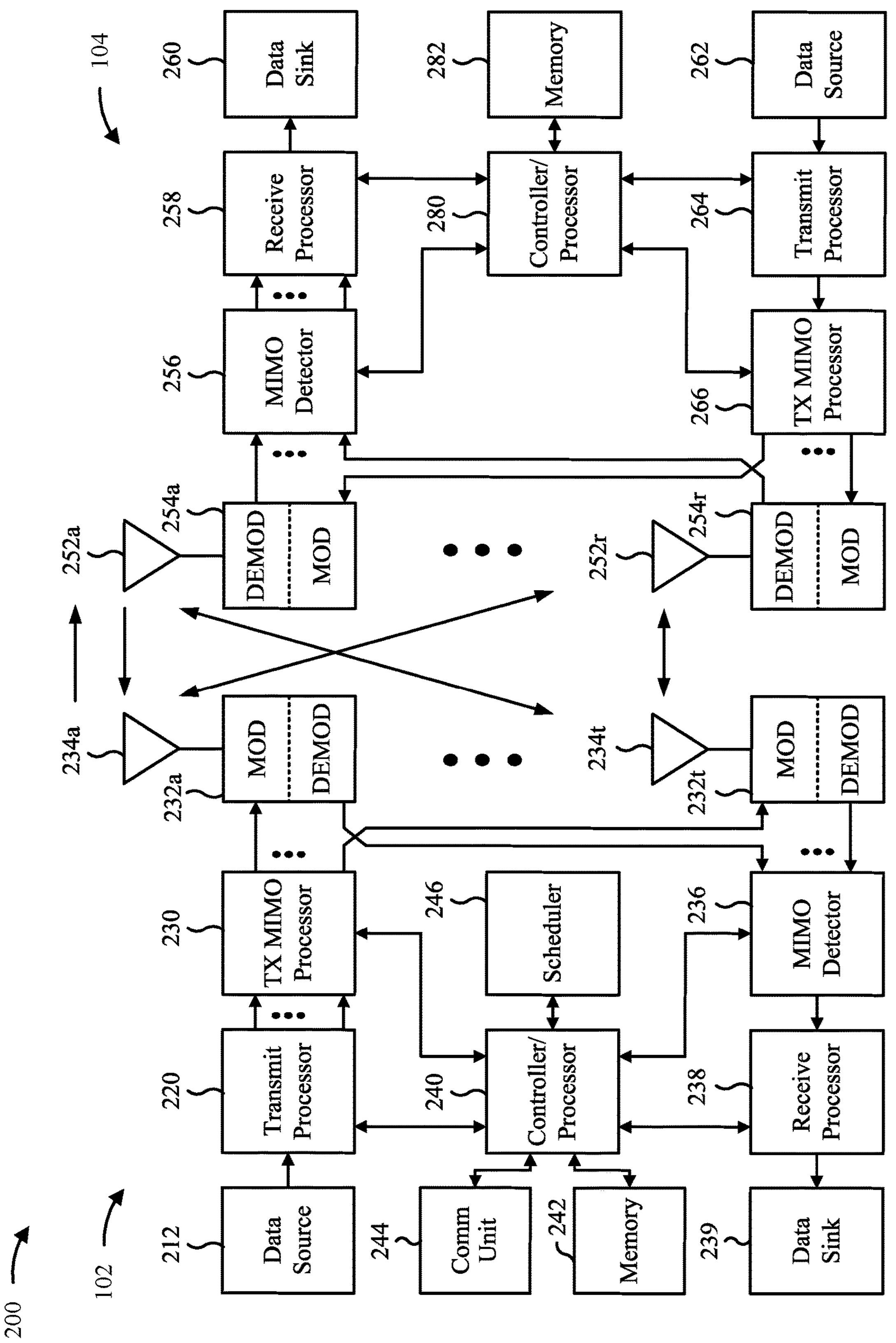
FIG. 2 illustrates a block diagram of a design of base station and user equipment (UE), which may be one of the base stations and one of the UEs in FIG. 1.

FIG. 2 shows a block diagram of a design 200 of a base station 102 and a UE 104, which may be one of the base stations and one of the UEs in FIG. 1. While design 200 depicts communications between a base station 102 and a UE 104 for the depicted examples below in describing aspects of the present disclosure, communications may be between two UEs 104 over a SL, two base stations 102, or other devices of the wireless network 100. Referring to the design 200, base station 102 may be equipped with T antennas 234*a* through 234*t*, and UE 104 may be equipped with R antennas 252*a* through 252*r* (with T≥1 and R≥1).

At base station 102, a transmit processor 220 may receive data from a data source 212 for one or more UEs, select one or more modulation and coding schemes (MCS) for each UE based at least in part on channel quality indicators (CQIs) received from the UE, process (e.g., encode and modulate) the data for each UE based at least in part on the MCS(s) selected for the UE, and provide data symbols for all UEs. Transmit processor 220 may also process system information (e.g., for semi-static resource partitioning information (SRPI) and/or the like) and control information (e.g., CQI requests, grants, upper layer signaling, and/or the like) and provide overhead symbols and control symbols. Transmit processor 220 may also generate reference symbols for reference signals (e.g., the cell-specific reference signal (CRS)) and synchronization signals (e.g., the primary synchronization signal (PSS) and secondary synchronization signal (SSS)). A transmit (TX) multiple-input multiple-output (MIMO) processor 230 may perform spatial processing (e.g., precoding) on the data symbols, the control symbols, the overhead symbols, and/or the reference symbols, if applicable, and may provide T output symbol streams to T modulators (MODs) 232*a* through 232*t*. Each modulator 232 may process a respective output symbol stream (e.g., for OFDM and/or the like) to obtain an output sample stream. Each modulator 232 may further process (e.g., convert to analog, amplify, filter, and upconvert) the output sample stream to obtain a downlink signal. T downlink signals from modulators 232*a* through 232*t* may be transmitted via T antennas 234*a* through 234*t*, respectively.

At UE 104, antennas 252*a* through 252*r* may receive the downlink signals from base station 102 and/or other base stations and may provide received signals to demodulators (DEMODs) 254*a* through 254*r*, respectively. Each demodulator 254 may condition (e.g., filter, amplify, down convert, and digitize) a received signal to obtain input samples. Each demodulator 254 may further process the input samples (e.g., for OFDM and/or the like) to obtain received symbols. A MIMO detector 256 may obtain received symbols from all R demodulators 254*a* through 254*r*, perform MIMO detection on the received symbols if applicable, and provide detected symbols. A receive processor 258 may process (e.g., demodulate and decode) the detected symbols, provide decoded data for UE 104 to a data sink 260, and provide decoded control information and system information to a controller/processor 280. A channel processor may determine reference signal received power (RSRP), received signal strength indicator (RSSI), reference signal received quality (RSRQ), channel quality indicator (CQI), and/or the like. In some aspects, one or more components of UE 104 may be included in a housing.

On the uplink, at UE 104, a transmit processor 264 may receive and process data from a data source 262 and control information (e.g., for reports comprising RSRP, RSSI, RSRQ, CQI, SINR, and/or the like) from controller/processor 280. Transmit processor 264 may also generate reference symbols for one or more reference signals. The symbols from transmit processor 264 may be precoded by a TX MIMO processor 266 if applicable, further processed by modulators 254*a* through 254*r*, and transmitted to base station 102. At base station 102, the uplink signals from UE 104 and other UEs may be received by antennas 234, processed by demodulators 232, detected by a MIMO detector 236 if applicable, and further processed by a receive processor 238 to obtain decoded data and control information sent by UE 104. Receive processor 238 may provide the decoded data to a data sink 239 and the decoded control information to controller/processor 240. Base station 102 may include communication unit 244 and communicate to another device via communication unit 244 (such as location server 172 via one or more core network 170 components).

Controller/processor 240 of base station 102, controller/processor 280 of UE 104, and/or any other component(s) of FIG. 2 may perform one or more techniques associated with securitization of PSI, as described in more detail herein. For example, controller/processor 240 of base station 102, controller/processor 280 of UE 104, and/or any other component(s) of FIG. 2 may perform or direct operations of the described processes depicted in the figures and/or other processes as described herein. Memories 242 and 282 may store data and program codes for base station 102 and UE 104, respectively. In some aspects, memory 242 and/or memory 282 may comprise a non-transitory computer-readable medium storing one or more instructions for wireless communication. For example, the one or more instructions, when executed by one or more processors of base station 102 and/or the UE 104 may perform or direct operations of the processes as described herein. A scheduler 246 may schedule UEs for data transmission on the downlink and/or uplink. In some implementations, a scheduler may be used by a UE 104 for data transmission on a sidelink.

As indicated above, FIG. 2 is provided as an example. Other examples may differ from what is described with regard to FIG. 2 (such as communications between two UEs or other types of devices of the wireless network).

Figure 3:
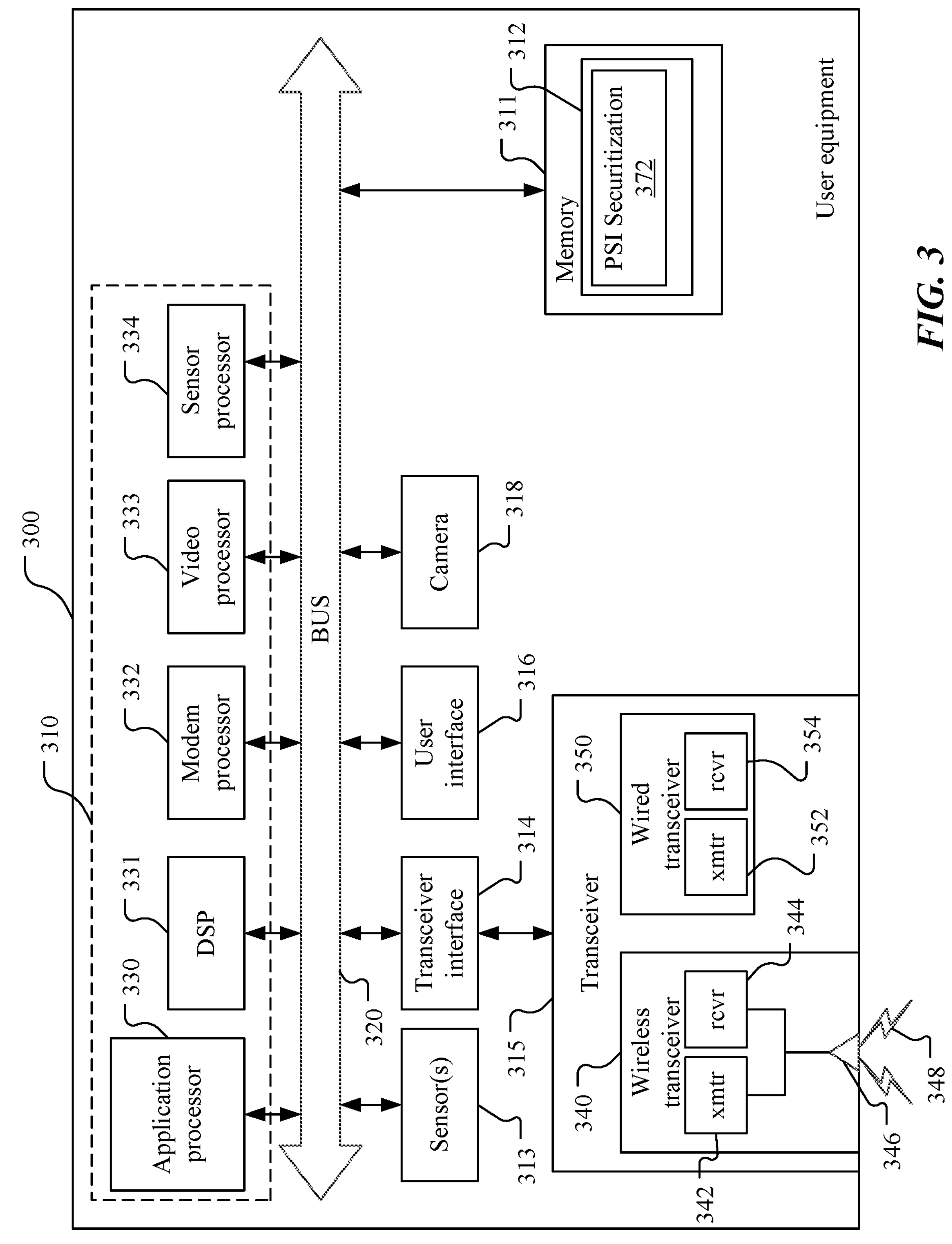
FIG. 3 illustrates a UE capable of supporting the securitization of positioning state information (PSI) in a wireless network.

FIG. 3 illustrates a UE 300, which is an example of the UE 104, capable of supporting the securitization of PSI for wireless communications in a wireless network (such as wireless network 100). For example, the UE 300 may be configured to obtain one or more PSI and generate one or more PSI reports including the one or more PSI that are to be received by the location server 172. To generate the one or more PSI reports, the UE 300 is to encrypt the PSI included in the PSI reports using one or more security keys at the UE 300. The UE 300 includes a computing platform including at least one processor 310, memory 311 including software (SW) 312, one or more sensors 313, a transceiver interface 314 for a transceiver 315, a user interface 316, and a camera 318. The processor 310, the memory 311, the sensor(s) 313, the transceiver interface 314, the user interface 316, and the camera 318 may be communicatively coupled to each other by a bus 320 (which may be configured, e.g., for optical and/or electrical communication). One or more of the shown apparatus (e.g., the camera 318 and/or one or more of the sensor(s) 313, etc.) may be omitted from the UE 300 or the UE 300 may include additional apparatus not shown (e.g., a positioning system receiver (such as a global navigation satellite system (GNSS) or a global positioning system (GPS) receiver and processing components)). The processor 310 may include one or more intelligent hardware devices, e.g., a central processing unit (CPU), a microcontroller, an application specific integrated circuit (ASIC), etc. The processor 310 may comprise multiple processors including an application processor 330, a Digital Signal Processor (DSP) 331, a modem processor 332, a video processor 333, and/or a sensor processor 334. One or more of the processors 330-334 may comprise multiple devices (e.g., multiple processors). For example, the sensor processor 334 may comprise, e.g., processors for radar, ultrasound, and/or lidar, etc. The modem processor 332 may support dual SIM/dual connectivity (or even more SIMs). For example, a SIM (Subscriber Identity Module or Subscriber Identification Module) may be used by an Original Equipment Manufacturer (OEM), and another SIM may be used by an end user of the UE 300 for connectivity. The memory 311 is a non-transitory storage medium that may include random access memory (RAM), flash memory, disc memory, and/or read-only memory (ROM), etc. The memory 311 stores the software 312, which may be processor-readable, processor-executable software code containing instructions that are configured to, when executed, cause the processor 310 to operate as a special purpose computer programmed to perform the various functions described herein. Alternatively, the software 312 may not be directly executable by the processor 310 but may be configured to cause the processor 310, e.g., when compiled and executed, to operate as a special purpose computer to perform the various functions described herein. The description may refer only to the processor 310 performing a function, but this includes other implementations such as where the processor 310 executes software and/or firmware. The description may refer to the processor 310 performing a function as shorthand for one or more of the processors 330-334 performing the function. The description may refer to the UE 300 performing a function as shorthand for one or more appropriate components of the UE 300 performing the function. The processor 310 may include a memory with stored instructions in addition to and/or instead of the memory 311. Functionality of the processor 310 is discussed more fully below.

The configuration of the UE 300 shown in FIG. 3 is an example and not limiting of the disclosure, including the claims, and other configurations may be used. For example, an example configuration of the UE includes one or more of the processors 330-334 of the processor 310, the memory 311, and the wireless transceiver 340. Other example configurations include one or more of the processors 330-334 of the processor 310, the memory 311, the wireless transceiver 340, and one or more of the sensor(s) 313, the user interface 316, the camera 318, and/or the wired transceiver 350.

The UE 300 may comprise the modem processor 332 that may be capable of performing baseband processing of signals received and down-converted by the transceiver 315. The modem processor 332 may perform baseband processing of signals to be upconverted for transmission by the transceiver 315. Also or alternatively, baseband processing may be performed by the processor 330 and/or the DSP 331. Other configurations, however, may be used to perform baseband processing.

The UE 300 may include the sensor(s) 313 that may include, for example, one or more of various types of sensors such as one or more inertial sensors, one or more barometric pressure sensors, one or more magnetometers, one or more environment sensors, one or more optical sensors, one or more weight sensors, and/or one or more radio frequency (RF) sensors, etc. An inertial measurement unit (IMU) may comprise, for example, one or more accelerometers (e.g., collectively responding to acceleration of the UE 300 in three dimensions) and/or one or more gyroscopes capable of detecting motion including rotation of the UE 300. The sensor(s) 313 may include one or more magnetometers to determine orientation (e.g., relative to magnetic north and/or true north) that may be used for any of a variety of purposes, e.g., to support one or more compass applications. The environment sensor(s) may comprise, for example, one or more temperature sensors, one or more barometric pressure sensors, one or more ambient light sensors, one or more camera imagers, and/or one or more microphones, etc. The sensor(s) 313 may generate analog and/or digital signals indications of which may be stored in the memory 311 and processed by the DSP 331 and/or the processor 330 in support of one or more applications such as, for example, applications directed to positioning and/or navigation operations. The sensor(s) 313 may be used in relative location measurements, relative location determination, motion determination, etc. Information detected by the sensor(s) 313 may be used for motion detection, relative displacement, dead reckoning, sensor-based location determination, and/or sensor-assisted location determination. The IMU may be configured to provide measurements about a direction of motion and/or a speed of motion of the UE 300, which may be used in relative location determination. For example, one or more accelerometers and/or one or more gyroscopes of the IMU may detect, respectively, a linear acceleration and a speed of rotation of the UE 300. The linear acceleration and speed of rotation measurements of the UE 300 may be integrated over time to determine an instantaneous direction of motion as well as a displacement of the UE 300. The instantaneous direction of motion and the displacement may be integrated to track a location of the UE 300. For example, a reference location of the UE 300 may be determined for a moment in time, and measurements from the accelerometer (s) and gyroscope(s) taken after this moment in time may be used in dead reckoning to determine present location of the UE 300 based on movement (direction and distance) of the UE 300 relative to the reference location.

The magnetometer(s) may determine magnetic field strengths in different directions which may be used to determine orientation of the UE 300. For example, the orientation may be used to provide a digital compass for the UE 300. The magnetometer may be a two-dimensional magnetometer configured to detect and provide indications of magnetic field strength in two orthogonal dimensions. Alternatively, the magnetometer may be a three-dimensional magnetometer configured to detect and provide indications of magnetic field strength in three orthogonal dimensions. The magnetometer may provide means for sensing a magnetic field and providing indications of the magnetic field, e.g., to the processor 310.

The barometric pressure sensors(s) may determine air pressure, which may be used to determine the elevation or current floor level in a building of the UE 300. For example, a differential pressure reading may be used to detect when the UE 300 has changed floor levels as well as the number of floors that have changed. The barometric pressure sensors (s) may provide means for sensing air pressure and providing indications of the air pressure, e.g., to the processor 310.

The transceiver 315 may include a wireless transceiver 340 and a wired transceiver 350 configured to communicate with other devices through wireless connections and wired connections, respectively. For example, the wireless transceiver 340 may include a transmitter 342 and receiver 344 coupled to one or more antennas 346 for transmitting (e.g., on one or more uplink channels and/or one or more sidelink channels) and/or receiving (e.g., on one or more downlink channels and/or one or more sidelink channels) wireless signals 348 and transducing signals from the wireless signals 348 to wired (e.g., electrical and/or optical) signals and from wired (e.g., electrical and/or optical) signals to the wireless signals 348. Thus, the transmitter 342 may include multiple transmitters that may be discrete components or combined/integrated components, and/or the receiver 344 may include multiple receivers that may be discrete components or combined/integrated components. The wireless transceiver 340 may be configured to communicate signals (e.g., with a base station and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. New Radio may use mm-wave frequencies and/or sub-6 GHZ frequencies. The wired transceiver 350 may include a transmitter 352 and a receiver 354 configured for wired communication. The transmitter 352 may include multiple transmitters that may be discrete components or combined/integrated components, and/or the receiver 354 may include multiple receivers that may be discrete components or combined/integrated components. The wired transceiver 350 may be configured, e.g., for optical communication and/or electrical communication. The transceiver 315 may be communicatively coupled to the transceiver interface 314, e.g., by optical and/or electrical connection. The transceiver interface 314 may be at least partially integrated with the transceiver 315. In some implementations, the transceiver 315 does not include a wired transceiver 350.

The antennas 346 may include an antenna array, which may be capable of receive beamforming or transmit beamforming, e.g., by increasing the gain setting and/or adjust the phase setting of an array of antennas in a particular direction to amplify (e.g., to increase the gain level of) the RF signals received from or transmitted towards that direction. The antennas 346 may further include a plurality of antenna panels, wherein each antenna panel is capable of beamforming. The antennas 346 are capable of adaptation, e.g., selection of one or more antennas for controlling receiving transmitted beams from or transmitting beams towards a base station or another UE. A reduced number of beams or a single beam, for example, may be selected for reception of a wide angle beam, e.g., to reduce power consumption, while an increased number of antennas in an antenna array may be selected when the transmit beam is relatively narrow. Conversely, the antennas 346 may be configured to transmit a wide angle beam or a relatively narrow beam.

The user interface 316 may comprise one or more of several devices such as, for example, a speaker, microphone, display device, vibration device, keyboard, touch screen, etc. The user interface 316 may include more than one of any of these devices. The user interface 316 may be configured to enable a user to interact with one or more applications hosted by the UE 300. For example, the user interface 316 may store indications of analog and/or digital signals in the memory 311 to be processed by DSP 331 and/or the processor 330 in response to action from a user. Similarly, applications hosted on the UE 300 may store indications of analog and/or digital signals in the memory 311 to present an output signal to a user. The user interface 316 may include an audio input/output (I/O) device comprising, for example, a speaker, a microphone, digital-to-analog circuitry, analog-to-digital circuitry, an amplifier and/or gain control circuitry (including more than one of any of these devices). Other configurations of an audio I/O device may be used. Also or alternatively, the user interface 316 may comprise one or more touch sensors responsive to touching and/or pressure, e.g., on a keyboard and/or touch screen of the user interface 316.

The UE 300 may include the camera 318 for capturing still or moving imagery. The camera 318 may comprise, for example, an imaging sensor (e.g., a charge coupled device or a CMOS imager), a lens, analog-to-digital circuitry, frame buffers, etc. Additional processing, conditioning, encoding, and/or compression of signals representing captured images may be performed by the general-purpose processor 330 and/or the DSP 331. Also or alternatively, the video processor 333 may perform conditioning, encoding, compression, and/or manipulation of signals representing captured images. The video processor 333 may decode/decompress stored image data for presentation on a display device (not shown), e.g., of the user interface 316. The memory 311 may store software 312 that contains executable program code or software instructions that when executed by the processor 310 may cause the processor 310 to operate as a special purpose computer programmed to perform the functions disclosed herein. As illustrated, the memory 311 may include one or more components or modules that may be implemented by the processor 310 to perform the disclosed functions. While the components or modules are illustrated as software 312 in memory 311 that is executable by the processor 310, it should be understood that the components or modules may be stored in another computer readable medium or may be dedicated hardware either in the processor 310 or off the processor. A number of software modules and data tables may reside in the memory 311 and be utilized by the processor 310 in order to manage both communications and the functionality described herein. It should be appreciated that the organization of the contents of the memory 311 as shown is merely exemplary, and as such the functionality of the modules and/or data structures may be combined, separated, and/or be structured in different ways depending upon the implementation.

The memory 311, for example, may include a PSI securitization module 372 that when implemented by the one or more processors 310 configures the one or more processors 310 to engage in obtaining and securing PSI of the UE 300 for reporting to another device in the wireless network. For example, the one or more processors 310 may be configured to engage in performing PSI securitization by identifying whether current security keys at the UE 300 (which may be stored in memory 311) can be used to encrypt the PSI, which PSI is to be encrypted, and which PSI is not to be encrypted based on a reporting configuration for PSI (which may also be stored in memory 311). The one or more processors 310 may be configured to generate one or more PSI reports for the one or more PSI based on whether the PSI can be encrypted and which PSI are to be encrypted. While the PSI securitization module 372 is depicted as being software included in memory 311, the PSI securitization module 372 may be a hardware module, a software module, or a combination of hardware and software. For example, the module may include one or more application specific integrated circuits (ASICs), executable code, or a combination of both.

Figure 4:
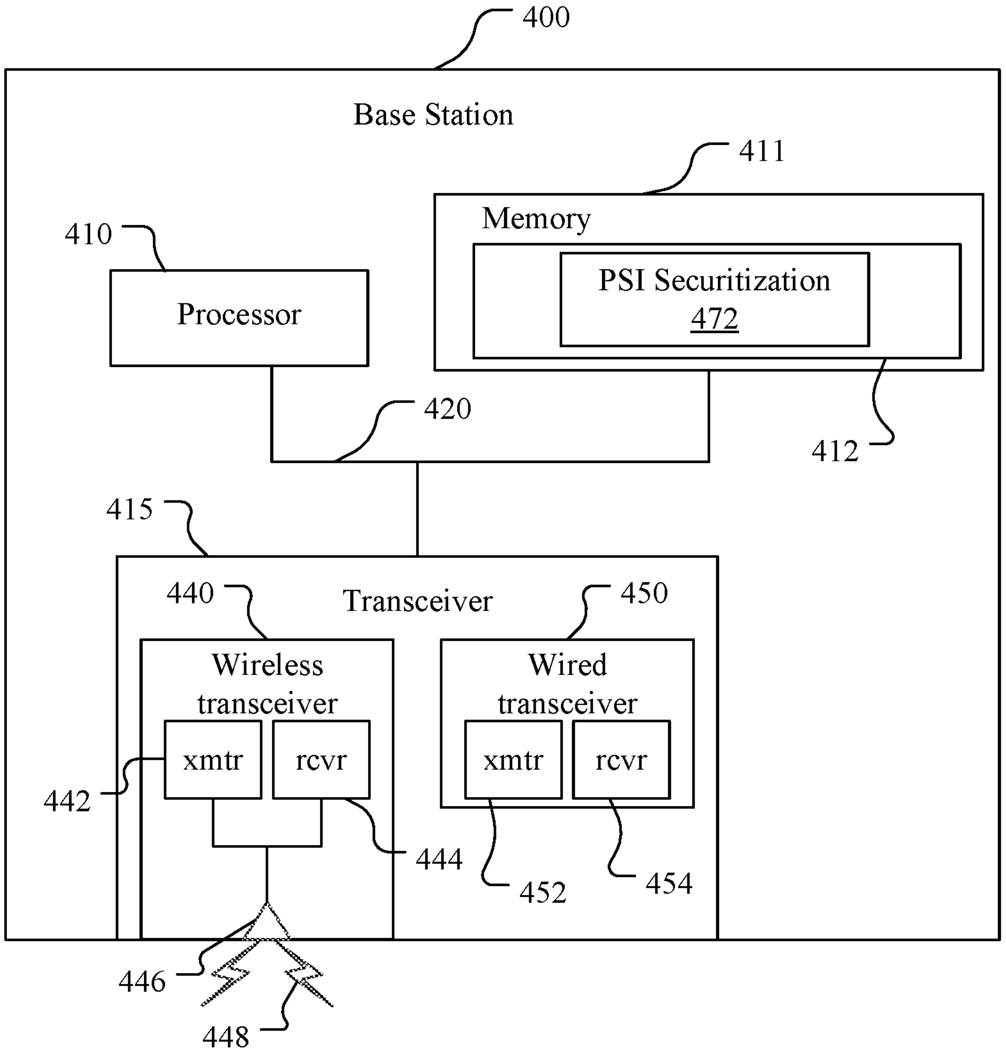
FIG. 4 illustrates a base station capable of supporting the securitization of PSI in a wireless network.

FIG. 4 illustrates a base station 400, which is an example of the base station 102, capable of supporting PSI securitization in a wireless network (e.g., a cellular network). The base station 400 includes a computing platform including at least one processor 410, memory 411 including software (SW) 412, and transceiver 415. The processor 410, the memory 411, and the transceiver 415 may be communicatively coupled to each other by a bus 420 (which may be configured, e.g., for optical and/or electrical communication). One or more of the shown apparatus may be omitted from the base station 400, or the base station 400 may include one or more apparatus not shown. The processor 410 may include one or more intelligent hardware devices, e.g., a central processing unit (CPU), a microcontroller, an application specific integrated circuit (ASIC), etc. The processor 410 may comprise multiple processors (e.g., including one or more of an application processor, a DSP, a modem processor, a video processor, and/or a sensor processor, similar to that shown in FIG. 3). The memory 411 is a non-transitory storage medium that may include random access memory (RAM)), flash memory, disc memory, and/or read-only memory (ROM), etc. The memory 411 stores the software 412 which may be processor-readable, processor-executable software code containing instructions that are configured to, when executed, cause the processor 410 to operate as a special purpose computer programmed to perform the various functions described herein. Alternatively, the software 412 may not be directly executable by the processor 410 but may be configured to cause the processor 410, e.g., when compiled and executed, to operate as a special purpose computer to perform the various functions described herein. The description may refer only to the processor 410 performing a function, but this includes other implementations such as where the processor 410 executes software and/or firmware. The description may refer to the processor 410 performing a function as shorthand for one or more of the processors contained in the processor 410 performing the function. The description may refer to the base station 400 performing a function as shorthand for one or more appropriate components of the base station 400 performing the function. The processor 410 may include a memory with stored instructions in addition to and/or instead of the memory 411.

The transceiver 415 may include a wireless transceiver 440 and a wired transceiver 450 configured to communicate with other devices through wireless connections and wired connections, respectively. For example, the wireless transceiver 440 may include a transmitter 442 and receiver 444 coupled to one or more antennas 446 for transmitting and/or receiving (e.g., on one or more uplink channels and/or one or more downlink channels) wireless signals 448 and transducing signals from the wireless signals 448 to wired (e.g., electrical and/or optical) signals and from wired (e.g., electrical and/or optical) signals to the wireless signals 448. The antenna 446 is one or more antenna arrays capable of beam forming and transmitting and receiving beams, including beams used in transmitting or receiving signals (including radar RS resources) to support motion state detection of a UE in the wireless network. The transmitter 442 may include multiple transmitters that may be discrete components or combined/integrated components, and/or the receiver 444 may include multiple receivers that may be discrete components or combined/integrated components. The wireless transceiver 440 may be configured to communicate signals (e.g., with the UE 300, one or more other UEs, and/or one or more other devices) according to a variety of radio access technologies (RATs) such as 5G New Radio (NR), GSM (Global System for Mobiles), UMTS (Universal Mobile Telecommunications System), AMPS (Advanced Mobile Phone System), CDMA (Code Division Multiple Access), WCDMA (Wideband CDMA), LTE (Long-Term Evolution), LTE Direct (LTE-D), 6GPP LTE-V2X (PC5), IEEE 802.11 (including IEEE 802.11p), WiFi, WiFi Direct (WiFi-D), Bluetooth®, Zigbee etc. The wired transceiver 450 may include a transmitter 452 and a receiver 454 configured for wired communication, e.g., to send communications to, and receive communications from, the radar server 172. The transmitter 452 may include multiple transmitters that may be discrete components or combined/integrated components, and/or the receiver 454 may include multiple receivers that may be discrete components or combined/integrated components. The wired transceiver 450 may be configured, e.g., for optical communication and/or electrical communication.

The configuration of the base station 400 shown in FIG. 4 is an example and not limiting of the disclosure, including the claims, and other configurations may be used. For example, the description herein discusses that the base station 400 is configured to perform or performs several functions, but one or more of these functions may be performed by the location server 172, the UE 300, and/or another UE of the wireless network.

The memory 411 may store software 412 that contains executable program code or software instructions that when executed by the processor 410 may cause the processor 410 to operate as a special purpose computer programmed to perform the functions disclosed herein. As illustrated, the memory 411 may include one or more components or modules that may be implemented by the processor 410 to perform the disclosed functions. While the components or modules are illustrated as software 412 in memory 411 that is executable by the processor 410, it should be understood that the components or modules may be stored in another computer readable medium or may be dedicated hardware either in the processor 410 or off the processor. A number of software modules and data tables may reside in the memory 411 and be utilized by the processor 410 in order to manage both communications and the functionality described herein. It should be appreciated that the organization of the contents of the memory 411 as shown is merely exemplary, and as such the functionality of the modules and/or data structures may be combined, separated, and/or be structured in different ways depending upon the implementation.

The memory 411, for example, may include PSI securitization module 472 that when implemented by the processor 410 configures the processor 410 to engage in a PSI securitization session for a UE as described herein. For example, the one or more processors 410 may configure the base station 400 to indicate one or more reference signals or other signals to be used for measuring PSI, to indicate to a UE a security priority for different types of PSI (which may be determined by the base station 400, a location server 172, or another suitable network component), to indicate one or more security keys to be used by a UE for encrypting PSI (which may be determined by the base station 400, the location server 172, or another suitable component of the network), to receive one or more PSI reports from a UE, and/or to provide the one or more PSI reports or the PSI from the reports to location server 172 or a core network 170 component. While the PSI securitization module 472 is depicted as being software included in memory 411, the PSI securitization module 472 may be a hardware module, a software module, or a combination of hardware and software. For example, the module may include one or more application specific integrated circuits (ASICs), executable code, or a combination of both.

As noted herein, a UE may be capable of obtaining different types of PSI. A UE "obtaining" a PSI may refer to the UE measuring or otherwise determining instances of PSI and/or the UE receiving PSI from another device. Regarding the UE measuring instances of the PSI, the UE may use one or more signals from another device (such as a reference signal on a DL from a base station or a signal on an SL from another UE). For example, the UE may measure an RSTD, an RSRP, one or more quality metrics, a TOA, or an SINR associated with a received signal. The UE may also measure whether the received signal is LOS or NLOS from the transmitting device. In some implementations, the UE may measure instances of PSI using one or more sensors (such as sensors 313 of UE 300). For example, the UE may measure a velocity of the UE or a location of the UE using a GNSS or GPS receiver or other types of sensors. A PSI itself may include a vector of one or more instances of the PSI. For example, the UE may periodically measure an RSTD. An RSTD vector includes one or more RSTD measurements. In another example, the UE 300 may periodically measure a velocity of the UE. A velocity vector includes one or more velocity measurements.

Regarding the UE receiving PSI from another device, one or more instances of PSI may be measured by another device and provided in one or more vectors to the UE. For example, a device may transmit radar signals reflected by the UE and received again by the device, and the device may measure a velocity, a position, or other information regarding the UE. The device provides the measurements as one or more vectors to the UE. For example, if the device is another UE, the UE provides the one or more vectors over a SL with the UE.

Example PSI include an RSTD vector, an RSRP vector, a velocity vector, a TOA vector, and an SINR vector. Another example PSI includes an LOS/NLOS vector indicating whether a received signal is LOS or NLOS. A further example PSI includes a multipath vector. The UE may be capable of communicating with another device (such as a base station) over multiple wireless paths (such as using one or more UEs as relays for the communication to reach a final destination). The multipath vector indicates information regarding the multiple paths being used (such as PSI measurements for the one or more paths, including TOA with reference to RSTD).

Another example PSI includes an Rx-Tx vector. A PHY layer of the UE communicates with a media access control (MAC) layer using an Rx-Tx vector (such as an Rx vector and a Tx vector). For example, a baseband processor of the UE uses one or more Rx-Tx vectors to communicate parameters with a processor of the UE performing MAC layer operations. Referring to FIG. 2, a baseband processor may include receive processor 258 and/or transmit processor 264, and the MAC layer processor may include controller/processor 280. The Rx-Tx vectors include the parameters for the PHY layer of the UE to generate, transmit, or receive a frame. Example transmit parameters may include a data rate, requested time of departure, and transmit power level. Example receive parameters may include a data rate, received signal strength indication (RSSI), antenna state, and power level metric. One or more of the indications in the Rx-Tx vectors between the PHY and MAC may be included in an Rx-Tx vector to be transmitted to another device as PSI.

Another example PSI includes a quality metric vector. One or more measurements of instances of PSI may be associated with a quality metric. In some implementations, in addition to measuring a TOA or an RSTD (or other instances of PSI) of a signal, the UE 300 may measure a quality metric associated with the TOA or the RSTD. For example, the UE 300 may measure a signal-to-noise ratio (SNR) of the signal whose TOA or RSTD is measured or a standard deviation of the TOA or RSTD with reference to other TOAs or RSTDs measured. A quality metric vector includes one or more quality metrics obtained by the UE.

Another example PSI includes a time-stamp associated with a vector. For example, an RSTD vector including an RSTD measurement is associated with a time-stamp indicating when the RSTD is measured. Each type of vector is associated with a time-stamp. For example: an RSTD vector is associated with an RSTD time-stamp; an Rx-Tx vector is associated with an Rx-Tx time-stamp (indicating when a frame is received or transmitted); an RSRP vector is associated with an RSRP time-stamp (indicating when the RSRP is measured); a quality metric vector is associated with a quality metric time-stamp (indicating when the quality metric is measured); a velocity vector is associated with a velocity time-stamp (indicating when the velocity is measured); a TOA vector is associated with a TOA time-stamp (indicating when the TOA is measured); a multipath vector is associated with a multipath time-stamp (indicating when the multiple paths are setup are configured); an LOS/NLOS vector is associated with an LOS/NLOS time-stamp (indicating when the signals associated with the LOS/NLOS vector are received); and an SINR vector is associated with an SINR time-stamp (indicating when the SINR is measured).

The UE 300 reports PSI in one or more PSI reports. A PSI report includes one or more vectors and/or one or more time-stamps associated with the one or more vectors. For example, the UE may transmit a PSI report on a physical uplink shared channel (PUSCH) to a base station or may transmit a PSI report on a physical sidelink shared channel (PSSCH) to another UE. The UE receiving the PSI report may relay the PSI report to another UE or a base station, with the PSI report ultimately being received by a base station. In some implementations, the base station receiving the PSI report forwards the PSI report or the PSI to the core network 170, and the location server 172 receives the PSI or PSI report. The location server 172 may use the PSI for wireless locationing, cell selection, or other operations associated with the wireless network. In some implementations, the base station receiving the PSI report may use the PSI for beam selection, channel configuration, or other operations associated with the wireless network.

To secure PSI for transmission to another device in one or more PSI reports, the UE encrypts PSI using one or more security keys. Any suitable encryption may be used. In some implementations, the one or more security keys may expire. For example, a security key may be associated with an expiration timer or otherwise expire after a defined amount of time. A base station or another UE may provide an updated security key to replace a security key that has expired or is about to expire. The updated security keys may be generated by the base station, by a location server, or by another suitable component. As such, the UE periodically receives one or more new security keys on a DL with the base station or an SL with another UE. The encrypting and decrypting devices (such as the UE and a base station) update the security key to be used so that each device uses the same security key.

If a security key is to expire, there is a limited amount of data that may be encrypted and transmitted before the security key expires. The PSI to be reported may be greater than the amount of data available that can be encrypted. Securitization of PSI by the UE includes prioritizing which PSI is to be encrypted and which PSI is to not be encrypted. As such, the UE may identify which PSI is to be transmitted encrypted, which PSI is to be transmitted unencrypted, and which PSI is to be prevented from being transmitted. As described above, other scenarios of encrypting PSI exist that may benefit from the securitization techniques described herein.

Figure 5:
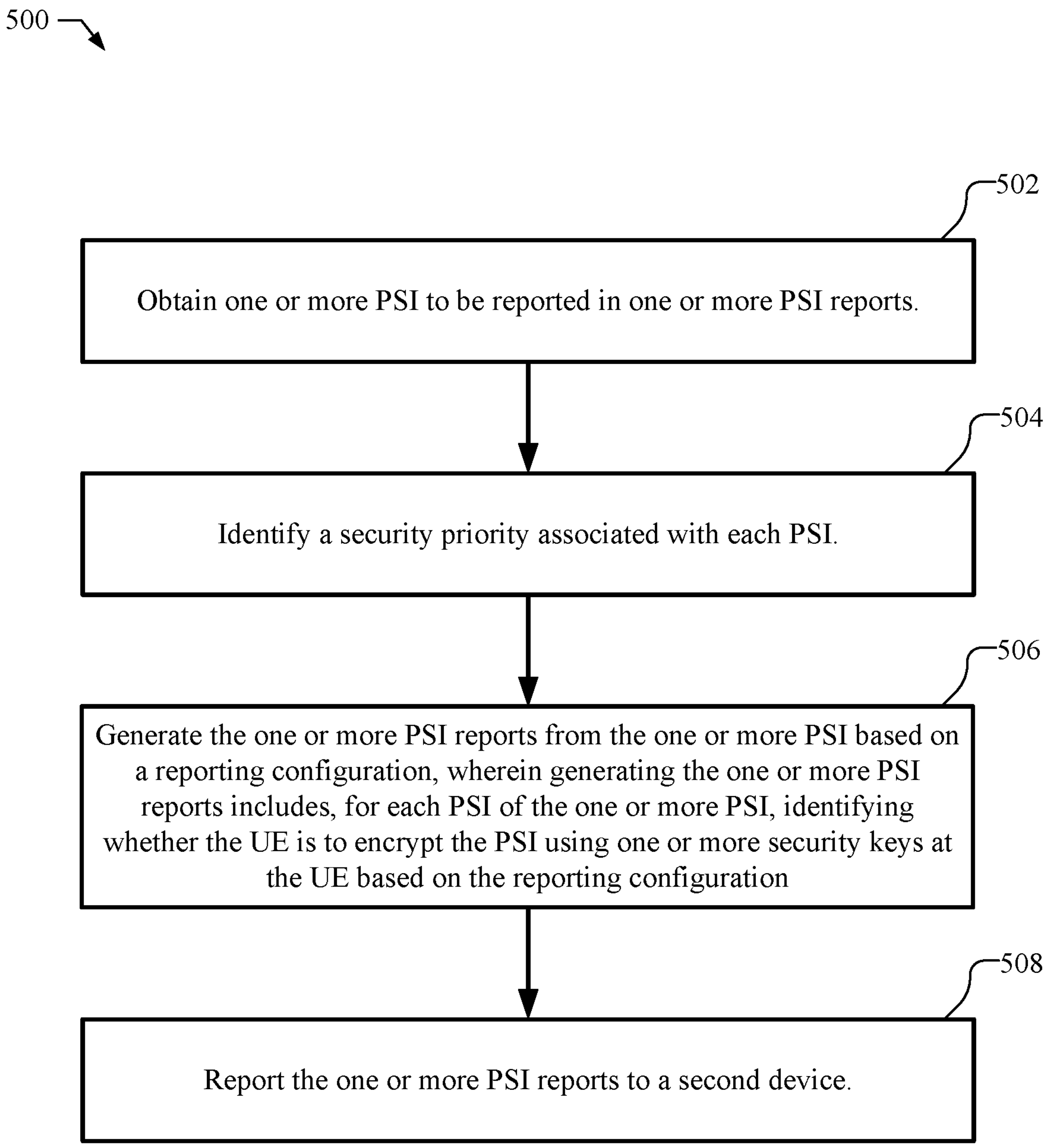
FIG. 5 shows a flowchart for an exemplary method for supporting the securitization of PSI in a wireless network.

FIG. 5 shows a flowchart for an exemplary method 500 for supporting securitization of PSI in a wireless network. The exemplary method 500 may be performed by any suitable UE of a wireless network (e.g., a cellular network) in a manner consistent with disclosed implementations. A UE that may perform one or more operations in method 500 may include at least one transceiver (such as one or more wireless transceivers and/or one or more wired transceivers), at least one memory, and at least one processor coupled to the at least one transceiver and the at least one memory. Referring to the UE 300 as an example UE, the at least one transceiver may include the transceiver 315 or the wireless transceiver 340, the at least one memory may include the memory 311, and the at least one processor may include the processor 310 or one or more of processors 330-334.

At block 502, the UE obtains one or more PSI to be reported in one or more PSI reports. Means for obtaining one or more PSI may include one or more of at least one transceiver (such as a wireless transceiver) of the UE to receive PSI from another device or receive a signal to be used in measuring one or more PSI or at least one processor to measure one or more PSI. In some implementations, means for obtaining PSI may include one or more sensors (such as a GNSS or GPS receiver). A UE means for obtaining the one or more PSI may include the transceiver 315 and one or more processors 310 with dedicated hardware or implementing executable code or software instructions 312 in memory 311, such as the PSI securitization module 372 in UE 300 shown in FIG. 3. Additionally or alternatively, the UE means may include the sensors 313 of the UE 300. The UE may obtain different types of PSI, such as one or more of the types of PSI described above.

At block 504, the UE identifies a security priority associated with each PSI. Means for identifying the security priority may include at least one processor of the UE. A security priority associated with a PSI may be based on a PSI type of the PSI. In some implementations, the security priority of a PSI type may be with reference to the security priority associated with other types of PSI. A UE means for identifying a security priority may include the one or more processors 310 with dedicated hardware or implementing executable code or software instructions 312 in memory 311, such as the PSI securitization module 372 in UE 300 shown in FIG. 3.

At block 506, the UE generates the one or more PSI reports from the one or more PSI based on a reporting configuration. Means for generating the one or more PSI reports may include at least one processor of the UE. The security priority of the PSI identified in block 506 may be associated with the reporting configuration. As such, generating the one or more PSI reports is based on the one or more security priorities identified. Generating the one or more PSI reports includes, for each PSI of the one or more PSI, identifying whether the UE is to encrypt the PSI using one or more security keys at the UE based on the reporting configuration. In particular, whether a specific PSI is to be encrypted using the one or more security keys at the UE is based on the specific PSI security priority. A UE means for generating the one or more PSI reports may include the one or more processors 310 with dedicated hardware or implementing executable code or software instructions 312 in memory 311, such as the PSI securitization module 372 in UE 300 shown in FIG. 3.

At block 508, the UE reports the one or more PSI reports to a second device. Means for reporting the one or more PSI reports may include at least one transceiver of the UE. The second device may be a base station (with the one or more PSI reports transmitted over a UL with the base station) or another UE (with the one or more PSI reports transmitted over an SL with the other UE). A UE means for reporting the one or more PSI reports may include the transceiver 315 and one or more processors 310 with dedicated hardware or implementing executable code or software instructions 312 in memory 311, such as the PSI securitization module 372 in UE 300 shown in FIG. 3.

As noted above, a limited amount of data may be encrypted and transmitted using the one or more security keys. For example, a remaining amount of time that a security key is valid may be sufficient for encrypting up to a specific amount of data that may be transmitted and considered valid. In another example, a defined amount of available space for data on a UL may exist before a new security key is received on a DL. As such, for all of the PSI obtained, the UE may be unable to encrypt the PSI for transmission.

In some implementations, the UE identifies that the UE is able to encrypt at most a first portion of the one or more PSI for the one or more PSI reports using the one or more security keys. For at least one PSI of the one or more PSI, generating the one or more PSI reports based on the reporting configuration includes one of: dropping the PSI from being included in the one or more PSI reports; or including the PSI as partially encrypted or unencrypted in the one or more PSI reports. Dropping the PSI from being included in the one or more PSI reports, or including the PSI as partially encrypted or unencrypted, may be based on the security priority associated with the PSI. For example, a first portion of PSI may be encrypted, and a remaining portion of PSI may be unable to be fully encrypted up to a desired level. For any PSI in the remaining portion of PSI, the UE determines if the PSI is to be dropped from the PSI report instead of being reported or if the PSI is to be included unencrypted or partially encrypted in the PSI report. As used herein, "partially encrypted" refers to encryption using an expired security key, encryption below a desired encryption level (such as performing 128 bit encryption instead of a desired 256 bit encryption), or encryption that otherwise does not meet a desired encryption for the PSI. If an expired security key is used, the decrypting device may store previous, expired security keys. If decryption using the current security key is unsuccessful, the device may attempt to perform decryption using one or more of the previous security keys. Partial encryption of PSI may be indicated by the UE to the other device in the PSI report, in control information, or in another suitable manner so that the receiving device is able to decrypt the partially encrypted PSI.

In some implementations, a PSI report includes multiple PSI (such as multiple vectors and/or multiple time-stamps). For example, vectors and time-stamps may be in sequence in a PSI report. In some implementations, a PSI report includes a single PSI (such as one vector or one time-stamp). In this manner, each vector would be transmitted in a separate PSI report. As used herein, a PSI report may refer to a PSI report including one PSI or including a plurality of PSI unless explicitly stated otherwise.

In some implementations, generating the one or more PSI reports based on the reporting configuration may include prioritizing the one or more PSI in the one or more PSI reports from highest security priority to lowest security priority. As noted above, each type of PSI may be associated with a security priority. The UE may attempt to encrypt higher priority PSI before encrypting lower priority PSI. For example, if the UE is able to encrypt only a portion of the one or more PSI (such as before expiration of a security key), the UE encrypts the highest priority PSI and continues encrypting PSI based on security priority until the maximum amount that may be encrypted is reached. Each of the remaining PSI may be left unencrypted for reporting, may be partially encrypted, or may be dropped from reporting.

The security priority for a PSI type may be indicated in the reporting configuration, which is stored at the UE (such as in memory 311). In some implementations, the reporting configuration includes a list of PSI types indicating a security priority associated with each of the PSI types in the list. The list may be in a table with relational entries or in another suitable form to allow the UE to identify a security priority associated with a PSI based on the type of PSI by using the list. In some implementations, the list provides a specific value indicating a security priority of a type of PSI (such as 1 indicating highest priority, 2 indicating next highest priority, and so on). In some implementations, the list ranks the types of PSI in sequence from highest priority to lowest priority (or vice versa) with reference to the other types of PSI. For example, the reporting configuration may include a ranking of PSI types in the list of PSI types from highest security priority to lowest security priority. In this manner, the UE may use the position of the PSI type in the list to identify a security priority associated with a PSI. In some implementations, the security priorities for the PSI types may be fixed at a device. For example, the security priorities may be stored in a ROM or firmware unable to be changed. For such fixed security priorities, a list of PSI types or other indication of the security priority per PSI type may be stored outside of the reporting configuration, or the reporting configuration may include elements of a storage that are static such that the list of PSI types may be considered to be included in the reporting configuration. Similarly, a ranking of PSI types based on security priority may be fixed, such as being stored in a ROM or otherwise stored in a manned that the ranking cannot be adjusted. For such a fixed ranking, the ranking may be stored outside of the reporting configuration, or the reporting configuration may include elements of a storage that are static such that the ranking may be considered to be included in the reporting configuration. In some other implementations, the list of PSI types and/or the ranking of PSI types may be configurable such that security priorities may be adjustable. A configurable list of PSI types and/or ranking may be included in the reporting configuration.

The list of PSI types (which may or may not include a ranking of security priority for the different PSI types) may be generated using any suitable means. In some implementations, the security priorities are predefined at the UE (which may be fixed and unable to be adjusted or which may be adjustable later on). For example, the security priorities may be configured by a device manufacturer, by software loaded on the device, or by a user.

In some implementations, the UE receives security priorities associated with PSI types in the list of PSI types and the ranking of PSI types from another device of the cellular network. For example, location server 172 or a base station 400 may obtain the list of PSI types and security priorities for the PSI types to be used. The list and security priority information may be transmitted to the UE 300 directly from the base station 400 or via one or more relay UEs.

In some implementations, the UE determines the ranking of PSI types and reports the ranking of PSI types together with the one or more PSI reports. In this manner, the other devices of the wireless network receiving the one or more PSI reports may be apprised by the UE of the security priority of the PSI included in the one or more PSI reports. Alternatively, the security priority may be fixed and known at the other devices of the wireless network receiving the one or more PSI reports.

If capable of configuring a security priority of a PSI type, the UE may configure a security priority of a PSI type based on a security quality of service (QoS). In some implementations, the security QoS may be an internal QoS indicated by a higher layer of the UE. For example, an application layer of the UE may require certain PSI types to be reported, certain PSI types to have a specific level of encryption, or other requirements regarding reporting of one or more PSI.

The UE may configure a security priority of one or more PSI types based on the PSI reporting and securitization requirements from a higher layer of the UE. In some implementations, the UE may configure a security priority of a PSI type based on a security QoS from another device (such as a security QoS being indicated by a base station or another UE). The UE may report the configured security priority to another device of the cellular network. For example, the configured security priority may be reported to the base station or to the UE receiving the one or more PSI reports. Configuring a security priority based on an internal or received security QoS is described in more detail below.

Referring to the above example types of PSI described that may be associated with a security priority, the list of PSI types of the reporting configuration may indicate the security priority for PSI types including one or more of: an RSTD vector and RSTD time-stamp; an Rx-Tx vector and Rx-Tx time-stamp; an RSRP vector and RSRP time-stamp; a quality metric vector and quality metric time-stamp; a velocity vector and velocity time-stamp; a TOA vector and TOA time-stamp; a multipath vector and multipath time-stamp; an LOS/NLOS vector and LOS/NLOS time-stamp; or an SINR vector and SINR time-stamp. To note, a time-stamp may have a different security priority than the associated vector. In some implementations, the time-stamp is associated with a lower security priority than the vector. For example, an RSTD time-stamp may be associated with a lower security priority than an RSTD vector. The time-stamp may be lower priority since less personal identifiable information of the UE may be ascertained from an indication of a time a measurement is made as compared to the measurement itself.

The security priorities of the PSI types may be based on one or more security priority rules for prioritizing PSI. In some implementations, the reporting configuration includes the one or more security priority rules for prioritizing PSI. The rules may be used to generate the ranking of PSI type or to perform one or more operations described herein (such as prioritizing the PSI, ordering the PSI, and so on).

In some implementations, the one or more security priority rules include a rule that a first type of positioning measurement has a higher security priority than a second type of positioning measurement. For example, RSTD measurements may have higher priority than RSRP measurements, RSTD measurements may have higher priority than Tx-Rx vector values, and Tx-Rx vector values may have higher priority than RSRP measurements.

In some implementations, the one or more security priority rules include a rule that a quality metric associated with a positioning measurement has a lower security priority than the positioning measurement. For example, if a quality metric includes an RSSI of the signal used to measure an RSTD, the RSTD measurement may have a higher security priority than the RSSI measurement.

In some implementations, the one or more security priority rules include a rule that an indication of which reference is to be used for a positioning measurement has a higher security priority than any PSI resulting from the positioning measurement. A "reference" may refer to a reference TRP, a positioning reference signal (PRS) resource, or another reference signal resource or component to be used to perform one or more positioning measurements (such as measuring an RSTD, an RSRP, an SINR, and so on). An indication of the resource or component used in generating PSI has a higher security priority than the PSI itself.

In some implementations, the one or more security priority rules include a rule that security priorities to be used for different types of PSI are based on a positioning method to be used by the UE. For example, a UE may perform positioning operations based on a locationing management function (LMF) configuration of the UE. The LMF may be embodied in the location server 172, the base station 400, or another suitable component of the wireless network. Positioning operations are performed to generate positioning measurements to be reported, and the operations may be based on different methods of measuring a signal. For example, the UE may be configured to use time difference of arrival (TDOA), angle of departure (AoD), multiple round trip time (multi-RTT), or TDOA plus multi-RTT. The ranking of security priority of PSI types may be based on the different methods. For example: for TDOA, RSTD measurements may have higher priority than RSRP measurements; for AoD, RSRP measurements may have higher priority than RSTD measurements; for multi-RTT, Rx-Tx vector values may have higher priority than RSRP measurements; and for TDOA plus multi-RTT, an RSTD measurement associated with a serving cell may have a higher priority than an RSTD measurement associated with a neighboring cell (which may have a higher priority than Rx-Tx vector values for the neighboring cell). In some implementations, the one or more security priority rules include a rule that first-path PSI reporting has a higher security priority than multipath PSI reporting. Example first-path PSI measurements includes RSTD measurements, Rx-Tx vector values, and RSRP measurements. An example of multi-path PSI measurements includes a TOA measurement of an RSTD measurement for the multipath. As such, the UE may prioritize PSI from highest to lowest as first including RSTD vectors, Rx-Tx vectors, and RSRP vectors and then including quality metric vectors associated with the RSTD vectors, Rx-Tx vectors, and RSRP vectors and then including multipath vectors.

In some implementations, the one or more security priority rules include a rule that a time-stamp associated with a positioning measurement has a lower security priority than the positioning measurement. For example, if the ranking of PSI types includes RSTD vectors then RSRP vectors, the security priority of an RSTD time-stamp associated with an RSTD vector may be between the security priority of the RSTD vector and the security priority of an RSRP vector.

Referring back to describing prioritization of PSI, prioritization of PSI may include reordering the PSI based on the security priority. Without performing the operations described herein, PSI is typically reported in sequence of when the PSI is obtained. In this manner, a PSI generated first in time is reported before a PSI generated second in time (whether in the same PSI report or in consecutive PSI reports). The UE may include a memory to store the PSI in order of when the PSI is obtained. If the UE is able to encrypt only a portion of the one or more PSI (such as before expiration of a security key), the portion to be encrypted is to precede the remaining portion. In some implementations of prioritizing the one or more PSI, the UE orders the one or more PSI from highest security priority to lowest security priority. For example, the UE may access the memory including the PSI and reorder the PSI in memory based on the security priority of the PSI indicated in the reporting configuration. The UE may encrypt the reordered PSI from the beginning until reaching the amount that is able to be encrypted using the security key in order to encrypt the highest priority PSI. Each of the remaining PSI may be left unencrypted for reporting, may be partially encrypted, or may be dropped from reporting.

Division of PSI that is encrypted from PSI that is unencrypted or partially encrypted may occur within a PSI report or at the PSI report level. For example, a PSI report may include a plurality of PSI. A first portion of the plurality of PSI may be encrypted, and a remaining portion of the plurality of PSI may be unencrypted or partially encrypted. In some implementations, generating the one or more PSI reports based on the reporting configuration includes encrypting only a portion of PSI in a PSI report based on the prioritization of the one or more PSI.

In another example, a first PSI report may have all of its PSI encrypted while a successive PSI has none of its PSI encrypted (or the PSI may be partially encrypted). For example, each PSI report may include only one PSI or one type of PSI. In some implementations, generating the one or more PSI reports based on the reporting configuration includes prioritizing the one or more PSI reports based on the one or more security priorities of the one or more PSI. As such, the UE generating the one or more PSI reports with the PSI reports prioritized may include encrypting only a first subset of PSI reports of the one or more PSI reports based on the prioritization of the one or more PSI reports. Similar to as described above with reference to PSI in general, prioritizing the one or more PSI reports may include ordering the one or more PSI reports based on the prioritization of the one or more PSI reports. As such, the encrypted first subset of PSI reports precedes a remainder of PSI reports of the one or more ordered PSI reports that are reported to the other device (such as a base station or another UE).

As noted above, the UE may configure a security priority of a PSI type. Configuring the security priority may be based on an internal security QoS (such as from a higher layer of the UE) or may be based on a security QoS received from another device (such as from a base station or another UE). The internal security QoS may be an indication of the securitization requirements for PSI for an application executed at the UE or for other higher layer operations having specific requirements for the securitization of PSI. An example QoS may indicate which PSI are necessary to be reported, which PSI can be reported unencrypted or partially encrypted, which PSI are required to be encrypted, or any other indication of how PSI is to be handled by the UE. An example security QoS may also indicate a required strength of encryption for one or more PSI. For example, a specific type of PSI may require a minimum 256-bit encryption before being transmitted in the one or more PSI reports.

In some implementations, identifying whether the UE is to encrypt a PSI using one or more security keys at the UE is based on a strength of the one or more security keys at the UE. A security key at the UE may be associated with a metric of the strength of the security key. The metric may be any suitable metric. For example, if the metric is based on bit-strength of an encryption, the security key may be associated with a metric indicating the maximum bit strength of encryption to be performed using the security key. If an application layer or another device requires a type of PSI to be encrypted with a bit strength greater than the maximum bit strength, the UE may determine that the PSI is to be dropped from being reported. The UE may later report PSI of the PSI type if a stronger security key is obtained. In some implementations, the reporting configuration indicates how to handle PSI that cannot be encrypted based on PSI type (such as certain PSI being allowed to be transmitted unencrypted, certain PSI being dropped, or certain PSI being encrypted using an expired security key).

In another example, the metric may be based on a maximum amount of data that can be encrypted using the security key before expiration of the security key. An indication of a security QoS may be the amount of PSI required for an application of the UE or required by another device of the wireless network (such as for wireless locationing). The UE may compare the security QoS to the metric to determine if (and/or by how much) the amount that can be encrypted is less than an amount of PSI required for an application of the UE or required in performing wireless locationing using another device in the network.

Wireless locationing may use any suitable locationing protocol for the wireless network. Example wireless locationing protocols include the LTE positioning protocol (LPP) and 5G or NR positioning protocol (as defined by the 3GPP set of standards). Locationing may include infrastructure based positioning (in which transmissions between one or more base stations and the UE are used to determine the position of the UE) or UE-to-UE positioning (in which transmissions between UEs over one or more SLs are used to determine the position of the UE with reference to another UE). UE-to-UE positioning refers to positioning performed without involvement of any UL.

A request to configure a security priority and/or a security QoS may be received from another device for operations regarding a locationing protocol. The request may be received by the UE during configuration of a link between the UE and another device. Alternatively, the location server 172 may have the list of PSI types and security priorities associated defined, which is indicated to the UE or predefined at the UE for use in securitization of the PSI.

If the UE receives a request to configure a security priority, the UE determines the security priority and indicates the security priority to another device. For locationing services, the security priority may ultimately be received by the location server 172. In some implementations, the UE receives a request to configure a security priority for each PSI type in the list of PSI types. After configuring the one or more security priorities, the UE reports the one or more security priorities in a mobile originated location request (MO-LR).

As noted above, a security priority of a PSI type from the list of PSI types may be configured based on a security QoS. If the security QoS is associated with a location request, the UE may receive a security QoS from one of a base station over a DL or another UE over an SL. For example, for infrastructure based positioning, the location server 172 (which may embody the LMF) may have defined a security QoS that is provided to a base station for transmission to the UE to report the PSI. The security QoS may be transmitted by the base station during a DL or UL setup phase for positioning using the DL or UL.

In another example, for UE-to-UE positioning, the security QoS may be received from another UE. If UE-to-UE positioning using an SL is to be performed, the one or more PSI reports may be associated with the UE-to-UE positioning using the SL. The one or more PSI reports may be generated based on the security priorities configured by the UE. A security priority may be configured based on a security QoS from the other UE. The security QoS may be transmitted by the other UE during a SL positioning setup phase for UE-to-UE positioning using the SL.

Instead of being configured by a UE, one or more security priorities for UE-to-UE positioning may be configured by a base station. For example, the location server 172 may provide to the base station a security QoS associated with PSI for UE-to-UE positioning, or a UE may provide to the base station a security QoS for UE-to-UE positioning. The base station may configure a security priority for one or more PSI types of a PSI type list, and the base station may provide the one or more security priorities to one or both of the UEs to perform UE-to-UE positioning using the SL. Alternatively and as noted above, the location server 172 may have defined the security priorities, which may be provided to one or both of the UEs for UE-to-UE positioning.

As described above, a configuration report may include any suitable data for securitization and reporting of PSI to another device. The configuration report may include a list of PSI types, an indication of a security priority associated with each PSI type, and a ranking of PSI types based on security priority. The reporting configuration may also include a security QoS received, an indication as to whether a PSI type may be partially encrypted, whether a PSI type is to be dropped if not encrypted, and/or other information used in the generation of the one or more PSI reports. In performing the operations described herein, a UE is capable of prioritizing PSI based on the reporting configuration to ensure that the highest priority PSI is secured for reporting. In this manner, PSI may continue to be reported by a UE instead of dropping an entire batch of PSI based on limited capacity for encryption using one or more security keys.

Reference throughout this specification to "one example", "an example", "certain examples", or "exemplary implementation" means that a particular feature, structure, or characteristic described in connection with the feature and/or example may be included in at least one feature and/or example of claimed subject matter. Thus, the appearances of the phrase "in one example", "an example", "in certain examples" or "in certain implementations" or other like phrases in various places throughout this specification are not necessarily all referring to the same feature, example, and/or limitation. Furthermore, the particular features, structures, or characteristics may be combined in one or more examples and/or features.

Some portions of the detailed description included herein are presented in terms of algorithms or symbolic representations of operations on binary digital signals stored within a memory of a specific apparatus or special purpose computing device or platform. In the context of this particular specification, the term specific apparatus or the like includes a general purpose computer once it is programmed to perform particular operations pursuant to instructions from program software. Algorithmic descriptions or symbolic representations are examples of techniques used by those of ordinary skill in the signal processing or related arts to convey the substance of their work to others skilled in the art. An algorithm is considered to be a self-consistent sequence of operations or similar signal processing leading to a desired result. In this context, operations or processing involve physical manipulation of physical quantities. Typically, although not necessarily, such quantities may take the form of electrical or magnetic signals capable of being stored, transferred, combined, compared or otherwise manipulated. It has proven convenient at times, principally for reasons of common usage, to refer to such signals as bits, data, values, elements, symbols, characters, terms, numbers, numerals, or the like. It should be understood, however, that all of these or similar terms are to be associated with appropriate physical quantities and are merely convenient labels. Unless specifically stated otherwise, as apparent from the discussion herein, it is appreciated that throughout this specification discussions utilizing terms such as "processing," "computing," "calculating," "determining" or the like refer to actions or processes of a specific apparatus, such as a special purpose computer, special purpose computing apparatus or a similar special purpose electronic computing device. In the context of this specification, therefore, a special purpose computer or a similar special purpose electronic computing device is capable of manipulating or transforming signals, typically represented as physical electronic or magnetic quantities within memories, registers, or other information storage devices, transmission devices, or display devices of the special purpose computer or similar special purpose electronic computing device.

In the preceding detailed description, numerous specific details have been set forth to provide a thorough understanding of claimed subject matter. However, it will be understood by those skilled in the art that claimed subject matter may be practiced without these specific details. In other instances, methods and apparatuses that would be known by one of ordinary skill have not been described in detail so as not to obscure claimed subject matter.

The terms, "and", "or", and "and/or" as used herein may include a variety of meanings that also are expected to depend at least in part upon the context in which such terms are used. Typically, "or" if used to associate a list, such as A, B or C, is intended to mean A, B, and C, here used in the inclusive sense, as well as A, B or C, here used in the exclusive sense. In addition, the term "one or more" as used herein may be used to describe any feature, structure, or characteristic in the singular or may be used to describe a plurality or some other combination of features, structures or characteristics. Though, it should be noted that this is merely an illustrative example and claimed subject matter is not limited to this example.

While there has been illustrated and described what are presently considered to be example features, it will be understood by those skilled in the art that various other modifications may be made, and equivalents may be substituted, without departing from claimed subject matter. Additionally, many modifications may be made to adapt a particular situation to the teachings of claimed subject matter without departing from the central concept described herein.

Implementation examples are described in the following numbered clauses:

1. A method for supporting securitization of positioning state information (PSI) by a user equipment (UE) in a cellular network including:

obtaining one or more PSI to be reported in one or more PSI reports;

identifying a security priority associated with each PSI;

generating the one or more PSI reports from the one or more PSI based on a reporting configuration, where generating the one or more PSI reports includes, for each PSI of the one or more PSI, identifying whether the UE is to encrypt the PSI using one or more security keys at the UE based on the reporting configuration; and reporting the one or more PSI reports to a second device.

2. The method of clause 1, further including identifying that the UE is able to encrypt at most a first portion of the one or more PSI for the one or more PSI reports using the one or more security keys, where:

for at least one PSI of the one or more PSI, generating the one or more PSI reports based on the reporting configuration includes one of:

dropping the PSI from being included in the one or more PSI reports; or including the PSI as partially encrypted or unencrypted in the one or more PSI reports.

3. The method of clause 2, where dropping the PSI from being included in the one or more PSI reports is based on the security priority associated with the PSI.

4. The method of clause 2, where including the PSI as partially encrypted or unencrypted in the one or more PSI reports is based on the security priority associated with the PSI.

5. The method of clause 2, where generating the one or more PSI reports based on the reporting configuration includes prioritizing the one or more PSI in the one or more PSI reports from highest security priority to lowest security priority.

6. The method of clause 5, where generating the one or more PSI reports based on the reporting configuration includes encrypting only a portion of PSI in a PSI report based on the prioritization of the one or more PSI.

7. The method of clause 6, where prioritizing the one or more PSI includes ordering the one or more PSI from highest security priority to lowest security priority, where the encrypted portion of PSI in the PSI report precedes a remainder of the PSI report.

8. The method of clause 2, where generating the one or more PSI reports based on the reporting configuration includes prioritizing the one or more PSI reports based on the one or more security priorities of the one or more PSI.

9. The method of clause 8, where generating the one or more PSI reports based on the reporting configuration includes encrypting only a first subset of PSI reports of the one or more PSI reports based on the prioritization of the one or more PSI reports.

10. The method of clause 9, where prioritizing the one or more PSI reports includes ordering the one or more PSI reports based on the prioritization of the one or more PSI reports, where the encrypted first subset of PSI reports precedes a remainder of PSI reports of the one or more ordered PSI reports.

11. The method of clause 2, where the reporting configuration includes a list of PSI types indicating a security priority associated with each of the PSI types in the list.

12. The method of clause 11, further including receiving security priorities associated with PSI types in the list of PSI types from another device of the cellular network.

13. The method of clause 11, where the reporting configuration includes a ranking of PSI types in the list of PSI types from highest security priority to lowest security priority.

14. The method of clause 13, further including receiving the ranking of PSI types from another device of the cellular network.

15. The method of clause 13, further including:

determining the ranking of PSI types; and reporting the ranking of PSI types together with the one or more PSI reports.

16. The method of clause 11, further including determining a security priority of a PSI type from the list of PSI types based on a security quality of service (QoS).

17. The method of clause 16, further including reporting the configured security priority to another device of the cellular network.

18. The method of clause 17, further including receiving a request to configure the security priority, where the security priority is reported by the UE in a mobile originated location request (MO-LR).

19. The method of clause 11, where a security priority of a PSI type from the list of PSI types is configured based on a security quality of service (QoS) associated with a location request, where the security QoS is from one of:

a base station of the cellular network over a downlink; or a second UE of the cellular network over a sidelink.

20. The method of clause 1, where the one or more PSI reports are associated with UE-to-UE positioning using a sidelink.

21. The method of clause 20, where the security priority is configured based on a security quality of service (QoS) from the second UE during a sidelink positioning setup phase for UE-to-UE positioning using the sidelink.

22. The method of clause 21, where:

the security priority is configured by the base station; and the security priority is provided by the base station to one or more of the UE or the second UE for UE-to-UE positioning using the sidelink.

23. The method of clause 1, where the security priority associated with each PSI is based on a PSI type of the PSI.

24. The method of clause 23, where the PSI type is one of:

a reference signal time difference (RSTD) vector and RSTD time-stamp;

a UE receive-transmit (Rx-Tx) vector and Rx-Tx time-stamp;

a reference signal received power (RSRP) vector and RSRP time-stamp;

a quality metric vector and quality metric time-stamp;

a velocity vector and velocity time-stamp;

a time of arrival (TOA) vector and TOA time-stamp;

a multipath vector and multipath time-stamp;

a line of sight (LOS)/non-line of sight (NLOS) (LOS/NLOS) vector and LOS/NLOS time-stamp; or a signal to interference plus noise ratio (SINR) vector and SINR time-stamp.

25. The method of clause 1, where identifying whether the UE is to encrypt a PSI using one or more security keys at the UE is based on a strength of the one or more security keys at the UE.

26. The method of clause 1, where the reporting configuration includes one or more security priority rules for prioritizing PSI.

27. The method of clause 26, where the one or more security priority rules include a rule that a first type of positioning measurement has a higher security priority than a second type of positioning measurement.

28. The method of clause 26, where the one or more security priority rules include a rule that a quality metric associated with a positioning measurement has a lower security priority than the positioning measurement.

29. The method of clause 26, where the one or more security priority rules include a rule that an indication of which reference is to be used for a positioning measurement has a higher security priority than any PSI resulting from the positioning measurement.

30. The method of clause 26, where the one or more security priority rules include a rule that security priorities to be used for different types of PSI are based on a positioning method to be used by the UE.

31. The method of clause 26, where the one or more security priority rules include a rule that first-path PSI reporting has a higher security priority than multipath PSI reporting.

32. The method of clause 26, where the one or more security priority rules include a rule that a time-stamp associated with a positioning measurement has a lower security priority than the positioning measurement.

33. A device configured for supporting securitization of positioning state information (PSI) in a cellular network including:

at least one transceiver;

at least one memory; and at least one processor coupled to the at least one transceiver and the at least one memory, where the at least one processor is configured to cause the device to:

obtain one or more PSI to be reported in one or more PSI reports;

identify a security priority associated with each PSI;

generate the one or more PSI reports from the one or more PSI based on a reporting configuration, where generating the one or more PSI reports includes, for each PSI of the one or more PSI, identifying whether the UE is to encrypt the PSI using one or more security keys at the UE based on the reporting configuration; and report the one or more PSI reports to a second device.

34. The device of clause 33, where the at least one processor is further configured to cause the device to identify that the device is able to encrypt at most a first portion of the one or more PSI for the one or more PSI reports using the one or more security keys, where:

for at least one PSI of the one or more PSI, generating the one or more PSI reports based on the reporting configuration includes one of:

dropping the PSI from being included in the one or more PSI reports; or including the PSI as partially encrypted or unencrypted in the one or more PSI reports.

35. The device of clause 34, where dropping the PSI from being included in the one or more PSI reports is based on the security priority associated with the PSI.

36. The device of clause 34, where including the PSI as partially encrypted or unencrypted in the one or more PSI reports is based on the security priority associated with the PSI.

37. The device of clause 34, where generating the one or more PSI reports based on the reporting configuration includes prioritizing the one or more PSI in the one or more PSI reports from highest security priority to lowest security priority.

38. The device of clause 37, where generating the one or more PSI reports based on the reporting configuration includes encrypting only a portion of PSI in a PSI report based on the prioritization of the one or more PSI.

39. The device of clause 38, where prioritizing the one or more PSI includes ordering the one or more PSI from highest security priority to lowest security priority, where the encrypted portion of PSI in the PSI report precedes a remainder of the PSI report.

40. The device of clause 34, where generating the one or more PSI reports based on the reporting configuration includes prioritizing the one or more PSI reports based on the one or more security priorities of the one or more PSI.

41. The device of clause 40, where generating the one or more PSI reports based on the reporting configuration includes encrypting only a first subset of PSI reports of the one or more PSI reports based on the prioritization of the one or more PSI reports.

42. The device of clause 41, where prioritizing the one or more PSI reports includes ordering the one or more PSI reports based on the prioritization of the one or more PSI reports, where the encrypted first subset of PSI reports precedes a remainder of PSI reports of the one or more ordered PSI reports.

43. The device of clause 34, where the reporting configuration includes a list of PSI types indicating a security priority associated with each of the PSI types in the list.

44. The device of clause 43, where the at least one processor is configured to cause the device to receive security priorities associated with PSI types in the list of PSI types from another device of the cellular network.

45. The device of clause 43, where the reporting configuration includes a ranking of PSI types in the list of PSI types from highest security priority to lowest security priority.

46. The device of clause 45, where the at least one processor is configured to cause the device to receive the ranking of PSI types from another device of the cellular network.

47. The device of clause 45, where the at least one processor is configured to cause the device to:

determine the ranking of PSI types; and report the ranking of PSI types together with the one or more PSI reports.

48. The device of clause 43, where the at least one processor is configured to cause the device to determine a security priority of a PSI type from the list of PSI types based on a security quality of service (QoS).

49. The device of clause 48, where the at least one processor is configured to cause the device to report the configured security priority to another device of the cellular network.

50. The device of clause 49, where the at least one processor is configured to cause the device to receive a request to configure the security priority, where the security priority is reported by the device in a mobile originated location request (MO-LR).

51. The device of clause 43, where a security priority of a PSI type from the list of PSI types is configured based on a security quality of service (QoS) associated with a location request, where the security QoS is from one of:

a base station of the cellular network over a downlink; or a second UE of the cellular network over a sidelink.

52. The device of clause 33, where the one or more PSI reports are associated with UE-to-UE positioning using a sidelink.

53. The device of clause 52, where the security priority is configured based on a security quality of server (QoS) from the second UE during a sidelink positioning setup phase for UE-to-UE positioning using the sidelink.

54. The device of clause 53, where: the security priority is configured by the base station; and the security priority is provided by the base station to one or more of the device or the second UE for UE-to-UE positioning using the sidelink.

55. The device of clause 33, where the security priority associated with each PSI is based on a PSI type of the PSI.

56. The device of clause 55, where the PSI type is one of:
a reference signal time difference (RSTD) vector and RSTD time-stamp;
a UE receive-transmit (Rx-Tx) vector and Rx-Tx time-stamp;
a reference signal received power (RSRP) vector and RSRP time-stamp;
a quality metric vector and quality metric time-stamp;
a velocity vector and velocity time-stamp;
a time of arrival (TOA) vector and TOA time-stamp;
a multipath vector and multipath time-stamp;
a line of sight (LOS)/non-line of sight (NLOS) (LOS/NLOS) vector and LOS/NLOS time-stamp; or
a signal to interference plus noise ratio (SINR) vector and SINR time-stamp.

57. The device of clause 33, where identifying whether the device is to encrypt a PSI using one or more security keys at the device is based on a strength of the one or more security keys at the device.

58. The device of clause 33, where the reporting configuration includes one or more security priority rules for prioritizing PSI.

59. The device of clause 58, where the one or more security priority rules include a rule that a first type of positioning measurement has a higher security priority than a second type of positioning measurement.

60. The device of clause 58, where the one or more security priority rules include a rule that a quality metric associated with a positioning measurement has a lower security priority than the positioning measurement.

61. The device of clause 58, where the one or more security priority rules include a rule that an indication of which reference is to be used for a positioning measurement has a higher security priority than any PSI resulting from the positioning measurement.

62. The device of clause 58, where the one or more security priority rules include a rule that security priorities to be used for different types of PSI are based on a positioning method to be used by the device.

63. The device of clause 58, where the one or more security priority rules include a rule that first-path PSI reporting has a higher security priority than multipath PSI reporting.

64. The device of clause 58, where the one or more security priority rules include a rule that a time-stamp associated with a positioning measurement has a lower security priority than the positioning measurement.

65. A non-transitory computer-readable medium including instructions that, when executed by at least one processor of a device configured for supporting securitization of positioning state information (PSI) by a user equipment (UE) in a cellular network, causes the device to perform operations including:
obtaining one or more PSI to be reported in one or more PSI reports;
identifying a security priority associated with each PSI;
generating the one or more PSI reports from the one or more PSI based on a reporting configuration, where generating the one or more PSI reports includes, for each PSI of the one or more PSI, identifying whether the UE is to encrypt the PSI using one or more security keys at the UE based on the reporting configuration; and
reporting the one or more PSI reports to a second device.

66. The computer-readable medium of clause 65, where the operations further include identifying that the UE is able to encrypt at most a first portion of the one or more PSI for the one or more PSI reports using the one or more security keys, where:
for at least one PSI of the one or more PSI, generating the one or more PSI reports based on the reporting configuration includes one of:
dropping the PSI from being included in the one or more PSI reports; or
including the PSI as partially encrypted or unencrypted in the one or more PSI reports.

67. The computer-readable medium of clause 66, where dropping the PSI from being included in the one or more PSI reports is based on the security priority associated with the PSI.

68. The computer-readable medium of clause 66, where including the PSI as partially encrypted or unencrypted in the one or more PSI reports is based on the security priority associated with the PSI.

69. The computer-readable medium of clause 66, where generating the one or more PSI reports based on the reporting configuration includes prioritizing the one or more PSI in the one or more PSI reports from highest security priority to lowest security priority.

70. The computer-readable medium of clause 69, where generating the one or more PSI reports based on the reporting configuration includes encrypting only a portion of PSI in a PSI report based on the prioritization of the one or more PSI.

71. The computer-readable medium of clause 70, where prioritizing the one or more PSI includes ordering the one or more PSI from highest security priority to lowest security priority, where the encrypted portion of PSI in the PSI report precedes a remainder of the PSI report.

72. The computer-readable medium of clause 66, where generating the one or more PSI reports based on the reporting configuration includes prioritizing the one or more PSI reports based on the one or more security priorities of the one or more PSI.

73. The computer-readable medium of clause 72, where generating the one or more PSI reports based on the reporting configuration includes encrypting only a first subset of PSI reports of the one or more PSI reports based on the prioritization of the one or more PSI reports.

74. The computer-readable medium of clause 73, where prioritizing the one or more PSI reports includes ordering the one or more PSI reports based on the prioritization of the one or more PSI reports, where the encrypted first subset of PSI reports precedes a remainder of PSI reports of the one or more ordered PSI reports.

75. The computer-readable medium of clause 66, where the reporting configuration includes a list of PSI types indicating a security priority associated with each of the PSI types in the list.

76. The computer-readable medium of clause 75, where the operations further include receiving security priorities associated with PSI types in the list of PSI types from another device of the cellular network.

77. The computer-readable medium of clause 75, where the reporting configuration includes a ranking of PSI types in the list of PSI types from highest security priority to lowest security priority.

78. The computer-readable medium of clause 77, where the operations further include receiving the ranking of PSI types from another device of the cellular network.

79. The computer-readable medium of clause 77, where the operations further include:
determining the ranking of PSI types; and
reporting the ranking of PSI types together with the one or more PSI reports.
80. The computer-readable medium of clause 75, further including determining a security priority of a PSI type from the list of PSI types based on a security quality of service (QoS).
81. The computer-readable medium of clause 80, where the operations further include reporting the configured security priority to another device of the cellular network.
82. The computer-readable medium of clause 81, where the operations further include receiving a request to configure the security priority, where the security priority is reported by the UE in a mobile originated location request (MO-LR).
83. The computer-readable medium of clause 75, where a security priority of a PSI type from the list of PSI types is configured based on a security quality of service (QoS) associated with a location request, where the security QoS is from one of:
a base station of the cellular network over a downlink; or
a second UE of the cellular network over a sidelink.
84. The computer-readable medium of clause 65, where the one or more PSI reports are associated with UE-to-UE positioning using a sidelink.
85. The computer-readable medium of clause 84, where the security priority is configured based on a security quality of service (QoS) from the second UE during a sidelink positioning setup phase for UE-to-UE positioning using the sidelink.
86. The computer-readable medium of clause 85, where:
the security priority is configured by the base station; and
the security priority is provided by the base station to one or more of the UE or the second UE for UE-to-UE positioning using the sidelink.
87. The computer-readable medium of clause 65, where the security priority associated with each PSI is based on a PSI type of the PSI.
88. The computer-readable medium of clause 87, where the PSI type is one or more of:
a reference signal time difference (RSTD) vector and RSTD time-stamp;
a UE receive-transmit (Rx-Tx) vector and Rx-Tx time-stamp;
a reference signal received power (RSRP) vector and RSRP time-stamp;
a quality metric vector and quality metric time-stamp;
a velocity vector and velocity time-stamp;
a time of arrival (TOA) vector and TOA time-stamp;
a multipath vector and multipath time-stamp;
a line of sight (LOS)/non-line of sight (NLOS) (LOS/NLOS) vector and LOS/NLOS time-stamp; or
a signal to interference plus noise ratio (SINR) vector and SINR time-stamp.
89. The computer-readable medium of clause 65, where identifying whether the UE is to encrypt a PSI using one or more security keys at the UE is based on a strength of the one or more security keys at the UE.
90. The computer-readable medium of clause 65, where the reporting configuration includes one or more security priority rules for prioritizing PSI.
91. The computer-readable medium of clause 90, where the one or more security priority rules include a rule that a first type of positioning measurement has a higher security priority than a second type of positioning measurement.
92. The computer-readable medium of clause 90, where the one or more security priority rules include a rule that a quality metric associated with a positioning measurement has a lower security priority than the positioning measurement.
93. The computer-readable medium of clause 90, where the one or more security priority rules include a rule that an indication of which reference is to be used for a positioning measurement has a higher security priority than any PSI resulting from the positioning measurement.
94. The computer-readable medium of clause 90, where the one or more security priority rules include a rule that security priorities to be used for different types of PSI are based on a positioning method to be used by the UE.
95. The computer-readable medium of clause 90, where the one or more security priority rules include a rule that first-path PSI reporting has a higher security priority than multipath PSI reporting.
96. The computer-readable medium of clause 90, where the one or more security priority rules include a rule that a time-stamp associated with a positioning measurement has a lower security priority than the positioning measurement.
97. A device configured for supporting securitization of positioning state information (PSI) in a cellular network including:
means for obtaining one or more PSI to be reported in one or more PSI reports;
means for identifying a security priority associated with each PSI;
means for generating the one or more PSI reports from the one or more PSI based on a reporting configuration, where generating the one or more PSI reports includes, for each PSI of the one or more PSI, identifying whether the UE is to encrypt the PSI using one or more security keys at the UE based on the reporting configuration; and
means for reporting the one or more PSI reports to a second device.
98. The device of clause 97, further including means for identifying that the device is able to encrypt at most a first portion of the one or more PSI for the one or more PSI reports using the one or more security keys, where:
for at least one PSI of the one or more PSI, generating the one or more PSI reports based on the reporting configuration includes one of:
dropping the PSI from being included in the one or more PSI reports; or
including the PSI as partially encrypted or unencrypted in the one or more PSI reports.
99. The device of clause 98, where dropping the PSI from being included in the one or more PSI reports is based on the security priority associated with the PSI.
100. The device of clause 98, where including the PSI as partially encrypted or unencrypted in the one or more PSI reports is based on the security priority associated with the PSI.
101. The device of clause 98, where generating the one or more PSI reports based on the reporting configuration includes prioritizing the one or more PSI in the one or more PSI reports from highest security priority to lowest security priority.

102. The device of clause 101, where generating the one or more PSI reports based on the reporting configuration includes encrypting only a portion of PSI in a PSI report based on the prioritization of the one or more PSI.

103. The device of clause 102, where prioritizing the one or more PSI includes ordering the one or more PSI from highest security priority to lowest security priority, where the encrypted portion of PSI in the PSI report precedes a remainder of the PSI report.

104. The device of clause 98, where generating the one or more PSI reports based on the reporting configuration includes prioritizing the one or more PSI reports based on the one or more security priorities of the one or more PSI.

105. The device of clause 104, where generating the one or more PSI reports based on the reporting configuration includes encrypting only a first subset of PSI reports of the one or more PSI reports based on the prioritization of the one or more PSI reports.

106. The device of clause 105, where prioritizing the one or more PSI reports includes ordering the one or more PSI reports based on the prioritization of the one or more PSI reports, where the encrypted first subset of PSI reports precedes a remainder of PSI reports of the one or more ordered PSI reports.

107. The device of clause 98, where the reporting configuration includes a list of PSI types indicating a security priority associated with each of the PSI types in the list.

108. The device of clause 107, further including means for receiving security priorities associated with PSI types in the list of PSI types from another device of the cellular network.

109. The device of clause 107, where the reporting configuration includes a ranking of PSI types in the list of PSI types from highest security priority to lowest security priority.

110. The device of clause 109, further including means for receiving the ranking of PSI types from another device of the cellular network.

111. The device of clause 109, further including:

means for determining the ranking of PSI types; and means for reporting the ranking of PSI types together with the one or more PSI reports.

112. The device of clause 107, further including means for determining a security priority of a PSI type from the list of PSI types based on a security quality of service (QoS).

113. The device of clause 112, further including means for reporting the configured security priority to another device of the cellular network.

114. The device of clause 113, further including means for receiving a request to configure the security priority, where the security priority is reported by the device in a mobile originated location request (MO-LR).

115. The device of clause 107, where a security priority of a PSI type from the list of PSI types is configured based on a security quality of service (QoS) associated with a location request, where the security QoS is from one of:

a base station of the cellular network over a downlink; or a second UE of the cellular network over a sidelink.

116. The device of clause 97, where the one or more PSI reports are associated with UE-to-UE positioning using a sidelink.

117. The device of clause 116, where the security priority is configured based on a security quality of server (QoS) from the second UE during a sidelink positioning setup phase for UE-to-UE positioning using the sidelink.

118. The device of clause 117, where:

the security priority is configured by the base station; and the security priority is provided by the base station to one or more of the device or the second UE for UE-to-UE positioning using the sidelink.

119. The device of clause 97, where the security priority associated with each PSI is based on a PSI type of the PSI.

120. The method of clause 119, where the PSI type is one of:

a reference signal time difference (RSTD) vector and RSTD time-stamp;

a UE receive-transmit (Rx-Tx) vector and Rx-Tx time-stamp;

a reference signal received power (RSRP) vector and RSRP time-stamp;

a quality metric vector and quality metric time-stamp;

a velocity vector and velocity time-stamp;

a time of arrival (TOA) vector and TOA time-stamp;

a multipath vector and multipath time-stamp;

a line of sight (LOS)/non-line of sight (NLOS) (LOS/NLOS) vector and LOS/NLOS time-stamp; or a signal to interference plus noise ratio (SINR) vector and SINR time-stamp.

121. The device of clause 97, where identifying whether the device is to encrypt a PSI using one or more security keys at the device is based on a strength of the one or more security keys at the device.

122. The device of clause 97, where the reporting configuration includes one or more security priority rules for prioritizing PSI.

123. The device of clause 122, where the one or more security priority rules include a rule that a first type of positioning measurement has a higher security priority than a second type of positioning measurement.

124. The device of clause 122, where the one or more security priority rules include a rule that a quality metric associated with a positioning measurement has a lower security priority than the positioning measurement.

125. The device of clause 122, where the one or more security priority rules include a rule that an indication of which reference is to be used for a positioning measurement has a higher security priority than any PSI resulting from the positioning measurement.

126. The device of clause 122, where the one or more security priority rules include a rule that security priorities to be used for different types of PSI are based on a positioning method to be used by the device.

127. The device of clause 122, where the one or more security priority rules include a rule that first-path PSI reporting has a higher security priority than multipath PSI reporting.

128. The device of clause 122, where the one or more security priority rules include a rule that a time-stamp associated with a positioning measurement has a lower security priority than the positioning measurement.

Therefore, it is intended that claimed subject matter not be limited to the particular examples disclosed, but that such claimed subject matter may also include all aspects falling within the scope of appended claims, and equivalents thereof.

What is claimed is:

1. A device configured for supporting securitization of positioning state information (PSI) in a cellular network, comprising:

at least one transceiver;

at least one memory; and at least one processor coupled to the at least one transceiver and the at least one memory, wherein the at least one processor is configured to:

obtain one or more PSI to be reported in one or more PSI reports;

identify a security priority associated with each PSI;

generate the one or more PSI reports from the one or more PSI based on a reporting configuration, wherein to generate the one or more PSI reports the at least one processor is configured to, for each PSI of the one or more PSI, identify whether the device is to encrypt the PSI using one or more security keys at the device based on the reporting configuration and the security priority; and report the one or more PSI reports to a wireless device.

2. The device of claim 1, wherein the at least one processor is further configured to identify that the device is able to encrypt at most a first portion of the one or more PSI for the one or more PSI reports using the one or more security keys, wherein:

for at least one PSI of the one or more PSI, to generate the one or more PSI reports based on the reporting configuration, the at least one processor is configured to:

drop the PSI from being included in the one or more PSI reports; or include the PSI as partially encrypted or unencrypted in the one or more PSI reports.

3. The device of claim 2, wherein to drop the PSI from being included in the one or more PSI reports, the at least one processor is configured to drop the PSI from being included in the one or more PSI reports based on the security priority associated with the PSI.

4. The device of claim 2, wherein to include the PSI as partially encrypted or unencrypted in the one or more PSI reports, the at least one processor is configured to include the PSI as partially encrypted or unencrypted in the one or more PSI reports based on the security priority associated with the PSI.

5. The device of claim 2, wherein to generate the one or more PSI reports based on the reporting configuration, the at least one processor is configured to prioritize the one or more PSI in the one or more PSI reports from highest security priority to lowest security priority.

6. The device of claim 5, wherein to generate the one or more PSI reports based on the reporting configuration, the at least one processor is configured to encrypt only a portion of PSI in a PSI report based on the prioritization of the one or more PSI.

7. The device of claim 6, wherein to prioritize the one or more PSI, the at least one processor is configured to order the one or more PSI from highest security priority to lowest security priority, wherein the encrypted portion of PSI in the PSI report precedes a remainder of the PSI report.

8. The device of claim 2, wherein to generate the one or more PSI reports based on the reporting configuration, the at least one processor is configured to prioritize the one or more PSI reports based on the one or more security priorities of the one or more PSI.

9. The device of claim 8, wherein to generate the one or more PSI reports based on the reporting configuration, the at least one processor is configured to encrypt only a first subset of PSI reports of the one or more PSI reports based on the prioritization of the one or more PSI reports.

10. The device of claim 9, wherein to prioritize the one or more PSI reports, the at least one processor is configured to order the one or more PSI reports based on the prioritization of the one or more PSI reports, wherein the encrypted first subset of PSI reports precedes a remainder of PSI reports of the one or more ordered PSI reports.

11. The device of claim 2, wherein the reporting configuration includes a list of PSI types indicating a security priority associated with each of the PSI types in the list.

12. The device of claim 11, wherein the at least one processor is further configured to receive security priorities associated with PSI types in the list of PSI types from another wireless device of the cellular network.

13. The device of claim 12, wherein the reporting configuration includes a ranking of PSI types in the list of PSI types from highest security priority to lowest security priority.

14. The device of claim 13, wherein the at least one processor is further configured to receive the ranking of PSI types from the another wireless device of the cellular network.

15. The device of claim 13, wherein the at least one processor is configured to:

determine the ranking of PSI types; and report the ranking of PSI types together with the one or more PSI reports.

16. The device of claim 11, wherein the at least one processor is further configured to determine a security priority of a PSI type from the list of PSI types based on a security quality of service (QoS).

17. The device of claim 16, wherein the at least one processor is further configured to report the configured security priority to another wireless device of the cellular network.

18. The device of claim 17, wherein the at least one processor is further configured to receive a request to configure the security priority, wherein to report the security priority, the at least one processor is configured to report the configured security priority from the device in a mobile originated location request (MO-LR).

19. The device of claim 11, wherein a security priority of a PSI type from the list of PSI types is configured based on a security quality of service (QoS) associated with a location request, wherein the security QoS is from one of:

a base station of the cellular network over a downlink; or a second user equipment (UE) of the cellular network over a sidelink.

20. The device of claim 1, wherein the one or more PSI reports are associated with user equipment (UE)-to-UE positioning using a sidelink.

21. The device of claim 20, wherein the security priority is configured based on a security quality of server (QoS) from a second UE during a sidelink positioning setup phase for UE-to-UE positioning using the sidelink.

22. The device of claim 21, wherein:

the security priority is configured by a base station; and the security priority is provided by the base station to one or more of the device or the second UE for UE-to-UE positioning using the sidelink.

23. The device of claim 1, wherein the security priority associated with each PSI is based on a PSI type of the PSI.

24. The device of claim 23, wherein the PSI type is one of:

a reference signal time difference (RSTD) vector and RSTD time-stamp;

a user equipment (UE) receive-transmit (Rx-Tx) vector and Rx-Tx time-stamp;
a reference signal received power (RSRP) vector and RSRP time-stamp;
a quality metric vector and quality metric time-stamp;
a velocity vector and velocity time-stamp;
a time of arrival (TOA) vector and TOA time-stamp;
a multipath vector and multipath time-stamp;
a line of sight (LOS)/non-line of sight (NLOS) (LOS/NLOS) vector and LOS/NLOS time-stamp; or
a signal to interference plus noise ratio (SINR) vector and SINR time-stamp.

25. The device of claim 1, wherein to identify whether the device is to encrypt a PSI using one or more security keys at the device, the at least one processor is configured to identify whether the device is to encrypt a PSI using one or more security keys at the device based on a strength of the one or more security keys at the device.

26. The device of claim 1, wherein the reporting configuration includes one or more security priority rules for prioritizing PSI, and at least one of:
wherein the one or more security priority rules include a rule that a first type of positioning measurement has a higher security priority than a second type of positioning measurement,
wherein the one or more security priority rules include a rule that a quality metric associated with a positioning measurement has a lower security priority than the positioning measurement,
wherein the one or more security priority rules include a rule that an indication of which reference is to be used for a positioning measurement has a higher security priority than any PSI resulting from the positioning measurement,
wherein the one or more security priority rules include a rule that security priorities to be used for different types of PSI are based on a positioning method to be used by the device,
wherein the one or more security priority rules include a rule that first-path PSI reporting has a higher security priority than multipath PSI reporting, or
wherein the one or more security priority rules include a rule that a time-stamp associated with a positioning measurement has a lower security priority than the positioning measurement.

27. A device configured for supporting securitization of positioning state information (PSI) in a cellular network, comprising:
at least one transceiver;
at least one memory; and
at least one processor coupled to the at least one transceiver and the at least one memory,
wherein the at least one processor is configured to:
transmit, for a user equipment (UE), at least one security priority associated with one or more PSI to be reported in one or more PSI reports, at least one reference signal associated with the one or more PSI, and one or more security keys; and
receive the one or more PSI reports from the UE, wherein the one or more PSI reports are based on the at least one reference signal associated with the one or more PSI and the at least one security priority, and wherein the one or more PSI reports are encrypted according to the one or more security keys by the UE based on a reporting configuration and the at least one security priority.

28. The device of claim 27, wherein the at least one processor is further configured to:
transmit at least one of the one or more PSI reports from the UE to at least one of a location server or a core network component.

29. A method for supporting securitization of positioning state information (PSI), by a user equipment (UE) in a cellular network, comprising:
obtaining one or more PSI to be reported in one or more PSI reports;
identifying a security priority associated with each PSI;
generating the one or more PSI reports from the one or more PSI based on a reporting configuration, wherein generating the one or more PSI reports includes, for each PSI of the one or more PSI, identifying whether the UE is to encrypt the PSI using one or more security keys at the UE based on the reporting configuration and the security priority; and
reporting the one or more PSI reports to a wireless device.

30. A method for supporting securitization of positioning state information (PSI), by a network node in a cellular network, comprising:
transmitting, for a user equipment (UE), at least one security priority associated with one or more PSI to be reported in one or more PSI reports, at least one reference signal associated with the one or more PSI, and one or more security keys; and
receiving the one or more PSI reports from the UE, wherein the one or more PSI reports are based on the at least one reference signal associated with the one or more PSI and the at least one security priority, and wherein the one or more PSI reports are encrypted according to the one or more security keys by the UE based on a reporting configuration and the at least one security priority.

* * * * *